(12) United States Patent
Grant et al.

(10) Patent No.: US 7,286,894 B1
(45) Date of Patent: Oct. 23, 2007

(54) HAND-HELD COMPUTER DEVICE AND METHOD FOR INTERACTIVE DATA ACQUISITION, ANALYSIS, ANNOTATION, AND CALIBRATION

(75) Inventors: Wayne Clinton Grant, Half Moon Bay, CA (US); David Kent Johnson, San Francisco, CA (US); Paulo Raffaelli, San Francisco, CA (US); Rhonda Laureen Rosales, Los Altos, CA (US)

(73) Assignee: PASCO scientific, Roseville, CA (US)

( * ) Notice: Subject to any disclaimer, the term of this patent is extended or adjusted under 35 U.S.C. 154(b) by 0 days.

(21) Appl. No.: 09/479,031

(22) Filed: Jan. 7, 2000

(51) Int. Cl.
*G06F 19/00* (2006.01)
*G06F 15/16* (2006.01)

(52) U.S. Cl. ...................... 700/168; 709/201
(58) Field of Classification Search ................ 709/101; 700/17, 66, 83, 143, 150, 168
See application file for complete search history.

(56) References Cited

U.S. PATENT DOCUMENTS

| | | | |
|---|---|---|---|
| 4,565,999 A * | 1/1986 | King et al. ................. 345/158 |
| 5,132,968 A | 7/1992 | Cephus |
| 5,220,522 A | 6/1993 | Wilson et al. |
| 5,227,614 A | 7/1993 | Danielson et al. |
| 5,386,360 A | 1/1995 | Wilson et al. |
| 5,410,141 A | 4/1995 | Koenck et al. |
| 5,587,577 A | 12/1996 | Schultz |
| 5,638,299 A | 6/1997 | Miller |
| 5,790,977 A | 8/1998 | Ezekiel |
| 5,827,179 A | 10/1998 | Lichter et al. |
| 5,873,990 A * | 2/1999 | Wojciechowski et al. ... 204/406 |
| 5,876,351 A | 3/1999 | Rohde |
| 5,927,603 A * | 7/1999 | McNabb ..................... 239/63 |
| 5,941,837 A * | 8/1999 | Amano et al. .............. 600/595 |
| 6,039,258 A * | 3/2000 | Durbin et al. ......... 235/472.01 |
| 6,085,576 A * | 7/2000 | Sunshine et al. .......... 73/29.01 |
| 6,221,012 B1 * | 4/2001 | Maschke et al. ........... 600/301 |
| 6,238,338 B1 * | 5/2001 | DeLuca et al. ............ 600/300 |
| 6,375,572 B1 * | 4/2002 | Masuyama et al. .......... 463/43 |
| 7,107,072 B1 * | 9/2006 | Smith ..................... 455/556.2 |

FOREIGN PATENT DOCUMENTS

EP           450829 A1 *  10/1991

OTHER PUBLICATIONS

Gary T. Derosiers, "Pilot Hardware Add-Ons", Handheld Systems 6.4, Jul./Aug. 1998.
Vannevar Bush, "As We May Think", Atlantic Monthly, vol. 176, No. 1, Jul. 1945, pp. 101-108.

* cited by examiner

*Primary Examiner*—Thomas Pham
(74) *Attorney, Agent, or Firm*—Blakely, Sokoloff, Taylor & Zafman

(57) ABSTRACT

A handheld computer device for data acquisition is described. The device includes a hardware interface to be connected to a processing device and to an attachable sensor. The device also includes a data module to interact with the sensor and with the processing device and a display module to display data collection results on a display of the processing device.

37 Claims, 23 Drawing Sheets

HAND-HELD COMPUTER DEVICE AND METHOD FOR INTERACTIVE DATA ACQUISITION, ANALYSIS, ANNOTATION, AND CALIBRATION

BACKGROUND OF THE INVENTION

I. Field of the Invention

The scientific method begins with observation, that is, data acquisition. Sensors extend the reach and refine the precision of a human observer. For centuries all sensors (from Galileo's telescope to Hewlett and Packard's oscilloscope) were analog in nature, and gathered data only in forms that humans could perceive. Then sensors reached beyond the visible (across the electromagnetic spectrum, out into the astronomically distant heavens, down into the infinitesimally small, and eventually reaching within the atom to observe the operations of the nucleonic forces with the cloud chambers, radiation meters and scintillographs of physics). Sensors also have moved from observing static to moving to dynamic to forever-energetic conditions, until now even the flickering wisps of perception, thought, and life in the living brain have become viewable (as shifting colors within the frame of a living skull) through positive emission tomography. Yet observation alone, no matter how extended by sensors, is not all that there is to the scientific method.

Recording data that had been acquired allowed it to be transmitted across both distance and time. Allowed the data to be compared and contrasted, added to, sorted, ordered and re-ordered and classified. Yet important as the art of Taxonomy was and remains to progress today, the ancients such as Aristotle and Galen knew of such—and yet none of the classical scholars, the Greeks of Athens, the Romans of the Augustan Empire, or the Arabs of Cordoba used the scientific method. Observations were recorded and transmitted, but not used. Few made any comparison, or queried whether such comparisons might mean anything beyond what had been stated by the preceding authorities. Recording data alone, no matter how accurate the transcription or honest and skilled the monk, never lit up the dark age ere the Renaissance.

Recording enables comparison, and comparison eventually leads to analysis; and analysis, first to questions, then to theory, then to testing. Flaws in one attempt at data acquisition led to a second, improved attempt. Observations and recordings began to become connected, one set to another. Eventually, a new process evolved, wherein recital of data one had acquired was no longer sufficient. Observation, comparison and review of the process of data acquisition, as well as of the data acquired, became crucial to the new experimenters. To ensure accuracy, reproducibility became the watchword: to ensure reproducibility, observing and commenting upon the process became as much a part of the dynamic of data acquisition as the observations themselves. The scientific method may have arisen from data acquisition, but it depends as much if not more on observation of itself in process, on the dynamic structure and storage and analysis of process and result together. It is the interaction of the observer with the process, the annotation and analysis of the process during the acquisition, that fully enables the scientific method to reach its most rapid and useful stage. The scientist could take his instrument and notebooks into the field with him, make and annotate his observations synchronously and interactively, and thus remain thoroughly and directly in control of the overall process to ensure its most efficient and effective operation.

The final step from abstract reasoning to practical application of the new scientific method was formalized when merely theorizing (on the results of the data acquired or on the process as annotated) no longer proved sufficient: when action based on such observations became possible even during the process. The feedback had to operate on both the action and the process itself, for no one could guarantee ahead of time whether a particular error might arise from the instrument, the process, or an unexpected element in the environment.

A modern scientist, technician, or even methodical businessman, depends on data collection, analysis, and action to continually refine, improve, and further his knowledge and exertions.

Armed with analog sensors to seek out data, with means to record the data, and means to compare and analyze the data, he yet would be floundering, drowning in a sea of events and observations beyond human capacities were it not for one further major innovation; the computer. Mastery (or at least control) of details in digital form serves as the tool for the human brain, as the sensor serves as the tool for the human sense. But to bring the two together, the analog must be converted to the digital, the data formatted to that which the computer, rather than the human, may read and recall. Yet it and the results of such analysis must also be presented back to the user in a form he can comprehend and make use of with the minimum of special training, to render the feedback process most effective. Data became digital for faster, more efficient evaluation. The notebook became the digital computer, with number-crunching analytical prowess. Early computers were room-sized; early analog-to-digital converters were suitcase sized. And as a consequence of this transformation, field observations of the human observer and the subsequent analysis became once again separated; the human was displaced in location or time from the interaction between sensor and environment. Only at the very end of this century did the potential for reuniting the observer in the field with the instruments of both observation and analysis once more become feasible.

The faster that data can be acquired, or the more remote it is from purely human capabilities, the more crucial becomes the ability to use human judgment of context and condition during acquisition. Testing, observing, reacting, and testing again speeds up the process, made more accurate the results. The processing between the ears of the observer was and still is as important as the processing between the sensor and the data record. And the demand has been ever-growing for means to bring this method to the hand and eye of the individual observer and actor at the test-site and during a session; this reduces the costs and problems which any removal in time or space can cause to invalidate an experiment. The more human involvement can be assured, the less robust and rigid need the pre-designed or pre-made sensors and acting responses be. The closer the feedback, the more efficient the entire process becomes. Yet the more that information can be duplicated, distributed, and opened to external commentary, suggestion, analysis, or action, the more valuable any given set of observations may become. One needs data that fits within both the hand of the user and can be shared globally with colleagues everywhere, for the best and most powerful application of such data. And users need tools that fit them (and the environment of their use), or that can be changed by the user to do so, to make the best use of the users time and the effort of bringing the tools to the task and into the field.

This has led to an easily-stated problem; how can a human bring tools for his senses and his mind into the field, where the observations will be taken? People can only carry so much (just as they can only sense so much or remember so much or compare so much), at anyone time and in one place. Portability becomes crucial, for data exists where it exists and not (however much the pure scientist may wish it) solely and easily within the confines of a laboratory environment. No mountain will come to Mohammed should he wish to measure its height with a non-portable laser altimeter and hundred-kilogram mainframe with full tape decks (to process the results of each sighting shot)!

This invention generally relates to a device and method for data acquisition, comparison, and analysis that comprises a hand-held computer device with an attachable module having its own associated analog sensor, and having stored software suited or adaptable to the sensor, the attachable module, and that particular user for that particular use. The invention includes hardware and software that lets the human interact with computer and sensor combinations, that permits event- rather than clock-driven observations, that allows human senses, capabilities, and judgment to serve as an extension to the computer and digital processing synergistically with the computer's and sensor's capabilities, thereby most readily and flexibly extending that of the human. A further extension of the invention specifically allows the annotation of both the process and environmental context of the data acquisition beyond the limitations of the particular sensor and attachable module, capturing the 'between the ears' processing of the human observer, which can be as critical to ensure that the meaning is correctly ascribable to the results of the process as the data observations themselves are. A still further extension of the invention specifically allows interaction with the hand-held computer and associated attachable module with its sensor in order to calibrate and examine the combination, creating the potential for correctly evaluating the entire environment including the sensor and the process on which the data acquisition and analysis depends. And a still-further extension of the invention allows the interaction between the external conditions and the computer or the human or both together, thereby creating the opportunities for feedback loops and dynamic adaptation in real time. Once the data-acquisition dynamic is thus made available to the hand-held computer's user, because there is the potential for further linkage to additional, externally-based resources (such as an external computer. additional memory, further sensor, or additional programming), the flexibility and adaptability become limited only by what the communication channels can bear or the human user can manage, operate, handle, or is carrying to which the hand-held can be also adapted or modified to process and control. (No claim is made for using additional human observers in the data acquisition, comparison, or analysis; the use of trainees or graduate student assistants is already well-known, however imperfectly practised.)

For example, a human user could carry the hand-held computer device with an associated attachable module and sensor attached thereof for testing soil pH into the field to track and trace a suspected spill from an underground pipeline of an environmentally-hazardous substance. By calibrating the sensitivity to match the current environmental conditions, ranging from the day's temperature to the mix of soils subject to being tested, the most useful range of readings may be assured. Simultaneously, the user can be adding annotations as to smells, or sights, which the analog sensor and hand-held computer are not currently equipped to detect yet which may add or explain significance of readings, such as noting a 'discoloration' on the surface of the soil or indeed on the probe when withdrawn from the soil. The user could also correctly annotate the calibration process such that conversion from one set of records to the next could be accurately made. And, by using the connection to a network, the user might even be able to order the shutdown of the nearest valves to the greatest concentration of the spill and the opening of all those 'downstream' in the pipeline, thereby allowing the maximum safe drainage and minimizing the total extent of the spill. What previously may have required teams of workers, fields of sensors, repeated runs of sensor placements, test-runs, and off-site analysis, taking hours or days or weeks, can now become a single interactive process that combines the best of both human and digital capabilities in a portable, flexible, synergistic format.

It is this combination of capabilities that makes the difference from prior inventions in this field. Most leave out the human operator or human element, leaving themselves vulnerable to any internal failure in the sensor or the system, leaving themselves blind and deaf to elements of the environment forming the context for their data acquisition that may affect the process and the results, separating themselves from the human-based capabilities and skills and therefore having to repeat or re-run or re-evaluate the data acquisition results when problems or concerns or questions about the process arise, rather than solving them on the spot at the time. Many leave out the capability to act in real-time and on the spot as a consequence of immediate analysis, thereby abandoning all potential for a feedback-based interactive process. Also left out are the capabilities (1) to annotate the process and observations on a real-time basis by the in-the-field user or operator of the device; and (2) to calibrate the device/sensor/software combination for each particular context, whose absence either requires blind faith in the perfectibility of human-driven data acquisition and computer-monitored analog sensing, or risks creating an unreviewable and irreproducible (and hence. unusable) recording lacking contemporaneous evaluation of its accuracy, validity, and completeness.

As the user's input is a crucial portion of this invention, there are many formats which may be known by or familiar to a particular user. A user interface that can be customized by an individual user to that format which is most suitable for his current need (for sometimes accuracy, sometimes a more general summary, and sometimes the merest of assurances, are needed for the annotative, analytical, and active phases of the entire feedback process; but a user who cannot chose which is most appropriate at the moment will find his capacity limited by the harshly imposed process constraints of the system. Accordingly, an aspect of this invention is the deliberate capacity for flexibly altering the user interface according to the particular needs of the user as determined by the context and time of his interaction with the entire process.

The combination of human and computer capabilities synergistically permits adaptation to and awareness of contextual events, giving the user and the system a flexibility not feasible otherwise. Most data collection can be more readily made duplicable and analyzable if first digitized, yet the process of collection and digitization may require supervision or calibration to cope with differences between expectations and real-world conditions. Transitory or unpredictable conditions that otherwise may create tremendous difficulties for computer handling, or which may otherwise require invalidation of an entire run due to concerns over sensor or digitization flaws, can be annotated by a user or subjected to immediate re-evaluation. Analysis that suggests intervention or alteration can be performed by the human user who is on the spot, or signaled by or through him to handle problems beyond the scope of a particular specialized computer program or hardware. Both digitized analog sensors taking readings and human actions can be controlled either by the hand-held computer or user, while supported by a computer or network's worth of specialized records, programming, and actions. The capability to sense, evaluate, compare analyze, and act based on contextual cues from sensors not present or currently activated in the hand-held computer, or from machine-based sensor readings not otherwise accessible to a human user, allows immediate context-based feedback on both the process and the results. Experimental corrections can be made that incorporate local or remote judgment and analysis without delay or separation between the observer and the actor through the intermediary of the hand-held device with the appropriate attachable module and associated sensors.

2. Description of the Related Art

OBJECTS AND SUMMARY OF THE INVENTION

The process of effectively transforming data or observations into knowledge, and then putting knowledge into action, works best when the three interrelated activities (acquiring observations, monitoring the data-acquisition process, and acting upon an analysis arising from that data) are integrated, allowing direct, immediate, and localized feedback.

Errors can arise in perception, in analysis, and in action. Anyone of these, if not immediately subject to review and correction, can turn feedback from a virtuous to a vicious cycle. The closer and more accessible the process is to a human observer, the more opportunity for immediate correction or reaction to prevent such a problem from arising. The greater the separation in either time or space between the sensor, the computer, and the human observer, the less efficient and effective the scientific method becomes.

Prior Art—The Separation of Observer from Instrument, Records, and Process

The addition of the digital computer and the mechanical sensor. though they brought a salutary discipline and stringency to observations, separated the observer from the instrument, the records, and the process. Unlike a clipboard, a computer could not be taken into the field. (And was much more subject to disaster in any precipitate event—at least after the Bic became common.) In the thirty to forty years between the Eniac and the Palm Pilot, a generation of scientists, doctors, Technicians, and others struggled with a host of problems. A great many technical and scientific observations must be slightly modified from the original scheme on the fly due to unexpected, minimal, environmental and situational circumstances. Reviewing the patents and prior art in the field emphasizes the need for a reunion between the observer, the instrument, the records, and the entire process.

Furthermore, the act of separating the observer, sensor, and digital computer, however much it offered in accuracy, ease of recording, and analysis, did so at the expense of the potential to alter the situation in accordance with instructions, advice, or guidance from the observer, or from anyone engaged in concurrent and ongoing analysis. Such interaction could often correct for flaws which only become perceived in the operating context, as no projection ever entirely meets the complexity of the real world environment. Rejoining the observer with both the display and the process can prevent, among others, a vicious cycle of incorrect observation/incorrect correction (a variation of 'GIGO' or 'garbage in, garbage out') from arising, which means that runaway feedback can be readily averted rather than being triggered by a single out-of-bounds observation. But the solution offered in this embodiment of the invention has been woefully absent.

For example, the lightweight, self-contained, programmable data-acquisition system described in U.S. Pat. No. 5,638,299 is entirely dependent upon a remote computer, rather than one located in the user's hand, for both display and analysis of the data. As such, it fails to consider the need for a user-interface or unit controls where the user is located by the sensor, in order to render the data acquisition, analysis, and action processes interactive. Moreover, because the display (of the results of the data acquisition) is separated from the observer, there literally is no chance for that observer to be aware of or to make meaningful comments upon the results of the process as they are displayed. Accordingly, there is little potential for conscious correlation between corrective or insightful contextual observations and displayed results. Such potential as there is either requires the observation to take place where the host computer is located. or requires secondary analysis that tries to reconnect the time or context after the fact of any event rather than contemporaneously, which builds in a source of potential error in the feedback process and thereby limits its usefulness. Moreover, as the sole source of commands and configuration arise from the remote computer and cannot be displayed at the site of the observer and sensor, there is no chance for the observer to add meaningful interaction or effect any adaptation by the individual who is present and able to incorporate his or her own judgment or sense as part of the adaptive process.

Another missing element can be seen with U.S. Pat. No. 5,386,360. That invention, though it envisions data acquisition, analysis, and access that depends on a personal computer, sees as the sole corrective measure for a faulty sensor, rendering it inoperative. While this could prevent a vicious cycle from arising, there is little room left for further corrective measures. No distinction is made between transient, correctable, or permanently fatal faults; an out-of-range reading damns a sensor permanently. Also, unlike the current embodiment of this invention, the observer using that invention has little opportunity to annotate the process directly, potentially thereby allowing a later interpretation to accurately adjust for a localized, temporary, or unpredicted effect. Furthermore, that invention contains no mention of re-calibrating the sensor or the analytical process by the operator. And. while a personal computer can be carried with greater ease than a mainframe, it (plus the attendant monitor) lacks a great deal of ease of portability into difficult or hard-to-reach environments by any save those in good physical condition, while its power requirements are prodigious enough to make extended or often-repeated runs impractical. But the greatest weakness in this patent is that there is no need to limit the data input to the subset of possible values that can be forced through the translation of data keystrokes, which constrains potential digital from analog sensor readings to an artificially-imposed limitation of some hundred-odd possible signals. While one can always translate any radio broadcast into text or even into Morse code, doing so always robs the subtleties of tone, pace, pitch, and background noise that can be more important than the linear wording when it comes to conveying proper meaning. (Or greatly increases the 'data density' required to translate identical readings; it takes much less time to say 'S.O.S.' than its Morse equivalent.) Moreover, this invention, though it orients a user to the location and function of the equipment, does not orient the user to the capabilities, constraints, and dynamics of either the equipment or the processes invoked in its use or analysis, or action based on either or both of the preceding. It is a significant advance to allow the use of graphical icons, perhaps; but there is no mention of any flexibility in letting the user dictate the interface according to that which the user finds most serviceable or appropriate to the environment.

Environmental data acquisition via remote sensors, as described in U.S. Pat. No. 5,132,968, need not require radio communication means. There are any number of times or conditions where such would be difficult or dangerous to employ, or merely expensive, as that invention requires sensor(s), computer(s), and user(s) to possess or at least have access to radio communication means. A user may want to obtain direct readings via technologies not subject to radio interference, may not want to risk broadcasting a signal that could be misinterpreted or received by another unanticipated recipient, and be quite capable of modest physical effort to bring a hand-held device to the sensors in turn. Should there be any risk of invoking a blast (e.g. near a construction site using radio-triggered explosives), or the field strength of the radio or magnetic signal of the phenomena around the experiment be crucial, such radio communication means could readily provide more hazard and less value that the user would wish. Moreover, this invention fails to include any means for interacting with the user, fails to include him in the feedback cycle and allow for annotation of the ongoing process, and never considers the potential necessity of recalibrating a sensor rather than abandoning or replacing it. He is reduced, once again, to somehow pasting on handwritten notes and keeping them linked to the computer records.

But focusing on handwritten information alone, as U.S. Pat. No. 5,227,614 does, misses the power of interacting with analog-to-digital sensors. That patent is solely and narrowly focused on capturing handwritten information (subparagraphs (d) and (e) of the sole independent claim specifically address 'means for digitizing handwritten input information' and 'application of handwritten information to said digitizer input means'), though it does see some advantage for hand-held data capture within a 'shirt pocket' size (subparagraph (c) of claim one). There are far, far more analog sensor readings possible than mere handwritten information can capture in an accurate, timely, and effective fashion. The specification for that invention, when detailing the software command set, focuses even more narrowly on capturing handwritten signatures, with five commands aimed at self-checks (e.g. request version or revision number), six aimed specifically at signature capture, and four moderating the mode of capture. It does not address the need for interactivity during data capture to assess the accuracy thereof, or the need for analysis and comparison within the hand-held device for on-the-spot action, or the need for comparison either across multiple data inputs or of a particular data input against a library and/or remote storage for decisive reaction to the current circumstances. And the specification focuses on analog, rather than digital, and commercial or human-oriented interactivity rather than scientific or analytical processes as the core of the functions for the hand-held device. (For example, the specification mentions without detail input "of existing printed data, e.g. bar codes, text, and graphical information on p. 11. On page 13, it adds as possible, associated. input/output devices "a touch keyboard, digitizer tablet means, printers, laser bar code readers, FR modules, smart card interfaces, disk systems, full travel keyboards, larger displays, local area network interfaces, et cetera.") None of these are considered generally to be suitable for direct digital analysis or scientific use. In fact, this patent's discussion on "Digital Signal Processing" is related to bar-code reading (pages 17-23). Unfortunately, the real world is not universally pre-equipped with Universal Product Codes.

There are a number of more limited, special-purpose inventions that are not coincident with this invention, though they at first glance may seem to interact with particular claims herein. For example, U.S. Pat. No. 5,876,351 is a claim to a "portable and modular electrocardiogram (ECG) medical device". Despite the language immediately prior to it in the specification, which argued that the patent should be extended to "any predetermined diagnostic medical function, the claim explicitly limits it to ECG readings. In contrast, the present invention is not so limited. Even the subordinate claims for 'medical applications', that may cover 'ECG, other heart function, and integrated heart-and-nervous system reading' applications, are not just for isolated. single readings but involve their storage, analysis, comparison, and the interactivity with other software-based systems for decisive, expert interaction based on continuing readings rather than an individual, or even a series of individual and disconnected snapshots. Furthermore, the invention in U.S. Pat. No. 5,876,351 specifically requires both a single, particular user control (a joypad) and dictates the meaning and use of the arrow keys therein, rather than having the user interface conformable by software to the user's preferences within the constraints of the application's functional needs and possibilities. It requires, however, not merely that the device contain a joypad (which is but one possible control for a user interface) but specifies precisely the limited functions which can be invoked by the pairs of keys therein. Moreover, this invention fails to disclose any means for modifying the user interface (or even the conception of such a possibility), means for interacting with the user during the analytical and action processes after an observation, or engaging in a dynamic process of continuous or event-driven monitoring, as opposed to simply taking a single reading (or even a discrete set of single readings). And. to the extent any heart-monitoring use claim exists for this invention that does not depend upon incorporation of an ECG, this patent will neither be limiting nor apply.

Similarly, U.S. Pat. No. 5,827,179 makes claims for a "personal computer card for collection for real-time biological data". The invention again depends upon an external computer system which, when the card is added to it, becomes a 'powerful diagnostic instrument', The problem is, of course, that while the PC card itself that is the subject of this patent may be lightweight and portable, the system-as-a-whole which necessarily includes a personal computer fails such a test, As all the user-interface, interaction, storage, analysis, display, and interactivity depend upon the externally-linked personal computer, this patent fails to comprehend the present invention. Moreover, to the extent that its claims specifically require the incorporation of at least one, and in some cases several, particular and specific sensors (including a pressure transducer), it fails to limit the present invention which has no such specific requirement for full functionality.

The claims in U.S. Pat. No. 5,410,141 belie the broader text of the title and specification, for they require both a wireless transfer and an external host for what is a 'data terminal' rather than a self-contained unit. Moreover, that patent focuses entirely on data capture, without any user interactivity concerning the process. And as the specification makes clear, the focus of the entire patent is on a generalized claim to a bar-code reader (see e.g. claim 57's recitation of 'removable and replaceable code scanner module means'), rather than any external analog-to-digitally based environmental sensor(s).

The separation stated in U.S. Pat. No. 5,220,522 not only focuses on the keyboard port and bus, but also lacks the integrated performance and package of the current embodiment of this invention. Instead, its claims recite a clear separation between peripheral sensor, host computer, and peripheral data acquisition, monitor, and control device.

The invention in. and claims of U.S. Pat. No. 5,587,577 for a 'Modular Scanner with Hand-Held Data Terminal', not only focus on the physical aspects of a data acquisition system, but lack any element or claim as to synergistic operation with the data during or after its acquisition; for, as the title suggests, the machinery and process attached to the user is merely for data acquisition by the machinery, with the human playing little more than the role of a carrier.

Remote acquisition is disclosed in U.S. Pat. No. 5,790,977, "Data Acquisition from a Remote Instrument Via the Internet". The invention requires a host and remote system. However, and lacks any personal portability. The separation between display, analysis, and sensing subjects the user to all the uncertainties of a less-than-stable internet, which means that failures from mere communication mishaps now are added to the existing environmental uncertainties.

This embodiment of the invention focuses on bringing the human observer back into the heart of the process, making it feasible for him (or her) to interact with the data observation, analysis, and consequent action. Because the invention can be readily carried, and linked to any of a number of types of sensors (any that can be governed by analog-to-digital conversion, that is), its applications are not limited to a particular field. Because software governs the translation of the digital signals, the operation of the hand-held device itself. and the display of the results (or of the analysis, or even the guidance to the user), the inflexible limitations of hardware are overset; rather than being limited to a specific-purpose device or instrument, the observer has the set of potential instruments (or the set of potential reading

DESCRIPTION OF THE SEVERAL VIEWS OF THE DRAWINGS

This embodiment of the invention will be better understood with reference to drawings illustrating a preferred embodiment, in which:

FIG. 8B shows the steps of reviewing existing or new sensors. The user views the list of existing sensors and calibrations thereof (102), and then may view an existing sensor (106) or add a new sensor (104). If adding a sensor (110) the user may then optionally add a new calibration (118), possibly by calibrating by equation (126) or by reference (124) if allowed. If viewing an existing sensor (112) the user may also optionally view the existing calibration (120).

Both 8A and 86 show that at many steps in the process, the user may interleave annotations (60, 68, 74, 76, 82, 88, 108, 114, 116, 122) which may refer to that step or to conditions outside the process.

Figure 1:
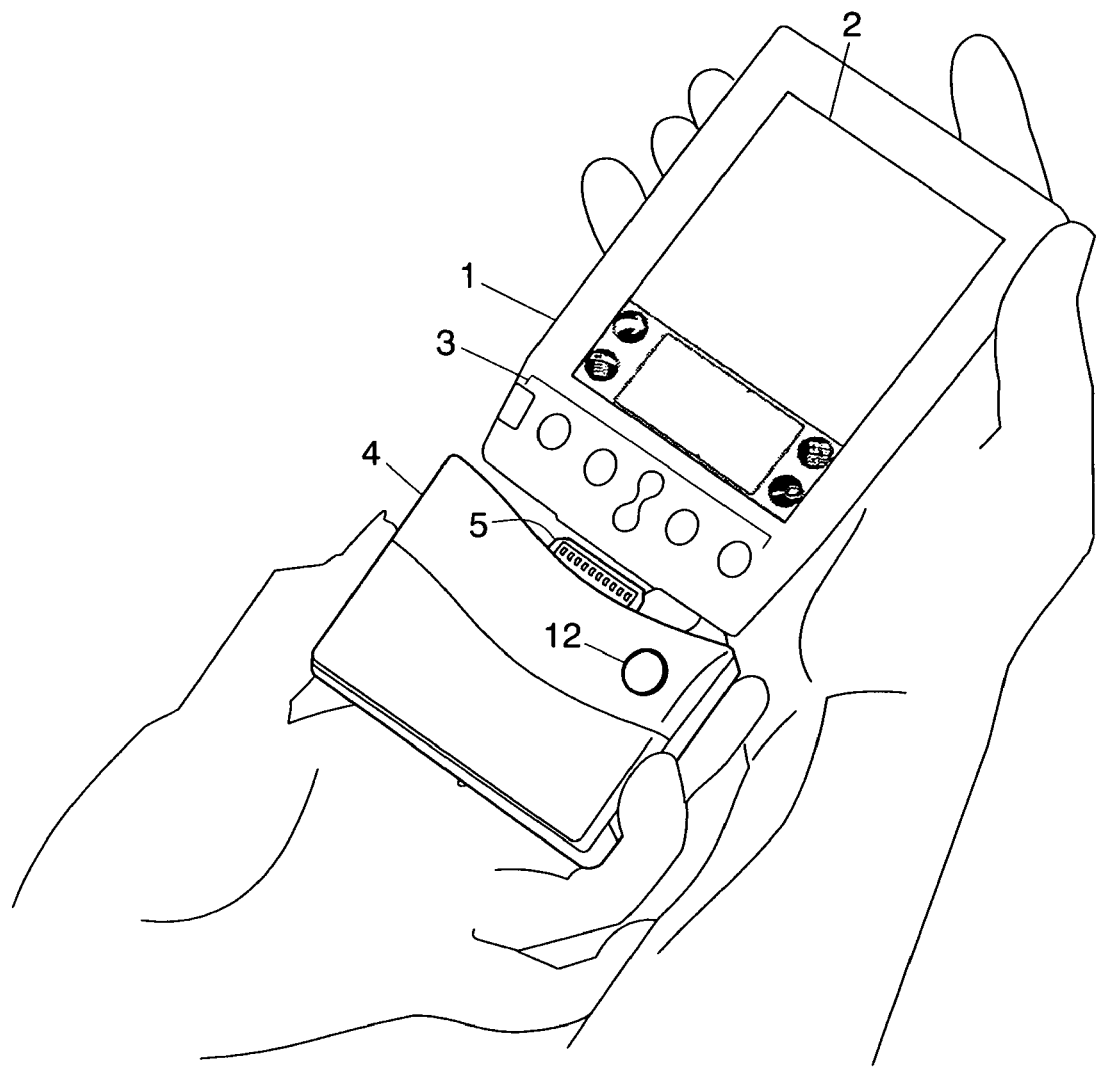
FIG. 1 shows a hand-held computer device (I) with a display screen (2), a set of hardware controls (3), an attachable module (4) that has means for communicating with the hand-held computer device (5) and its own hardware control (12). The absolute size of this hand-held computer device may vary, as may its weight, but it is designed to fit within the comfortable ergonomic limitations and positions of its human user and. more specifically, to that which can be carried about and used with a single hand. The operating system and application software are, of course, not visible.
Figure 2:
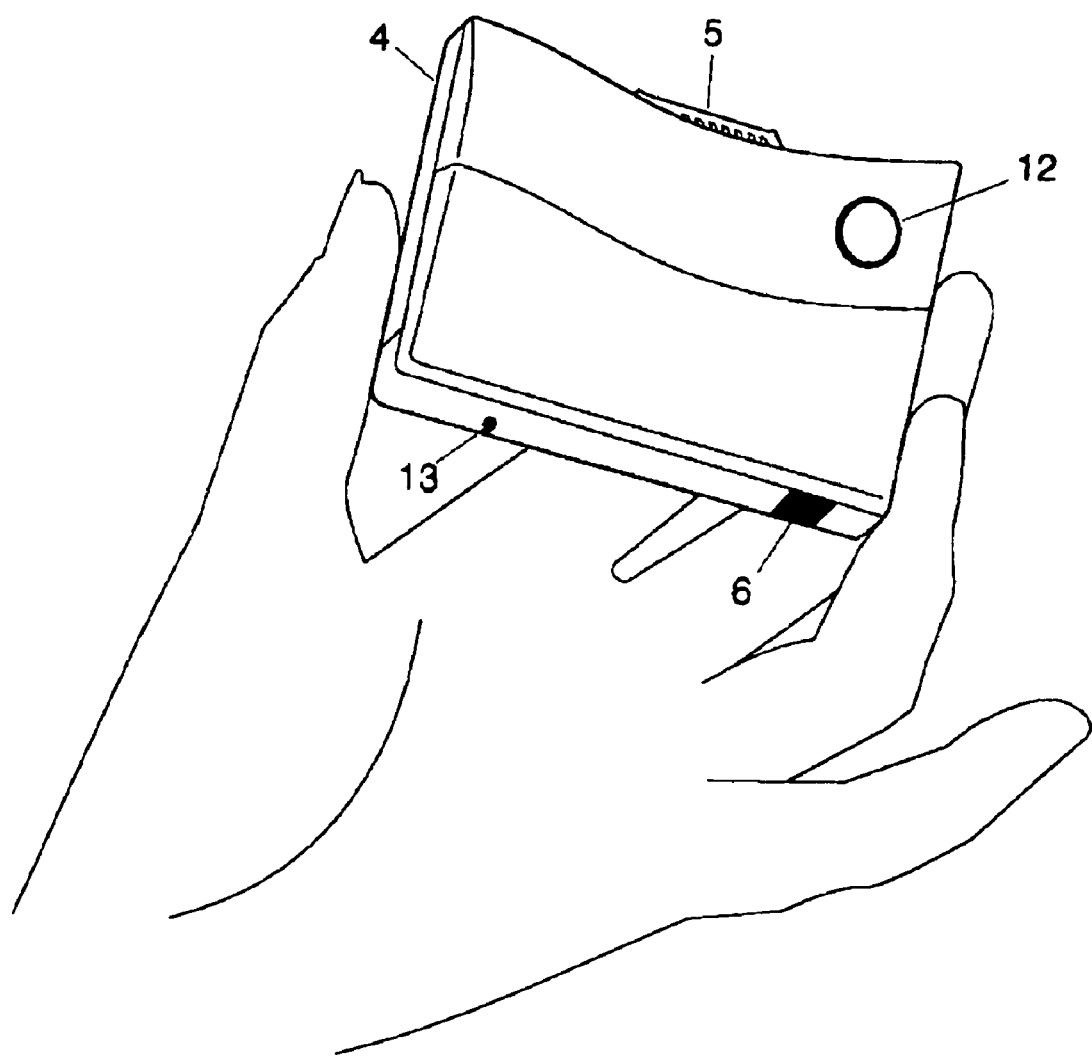
FIG. 2 shows the attachable module (4), from a different perspective from which both the means for connection to an external sensor (6) and an optional second peripheral connection means (which can go to a power source or other peripheral, including but not limited to a second sensor, of the same type or different from the first). The attachable module is of such a size and weight that either it alone, or it when combined with the hand-held computer device, will still fit within the comfortable ergonomic limitations and positions of its human user and. more specifically, to that which can be carried about and used with a single hand.
Figure 3:
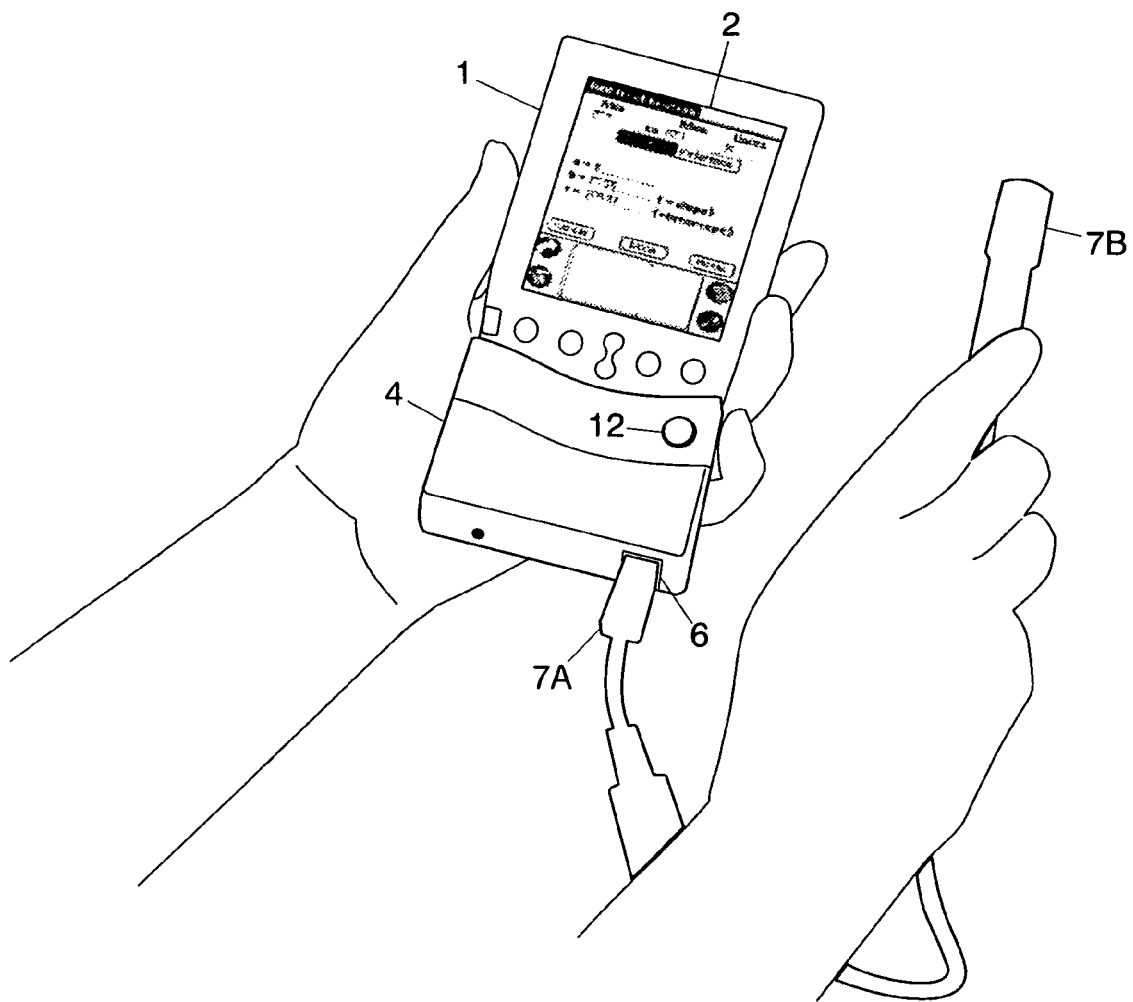
FIG. 3 shows the entire hand-held computer device (1), with attachable module (4) and an attached digital sensor that plugs into the attachable module at one end (7A) and contains the sensor at the other (7B). The physical details of the potential sensors are so varied that the entire combination may no longer fit within the comfortable ergonomic limitations and positions of its human user, at least, to that which can be carried about and used with a single hand, or even two hands (even though. as this drawing indicates, such is the preferred embodiment of this invention).
Figure 4:
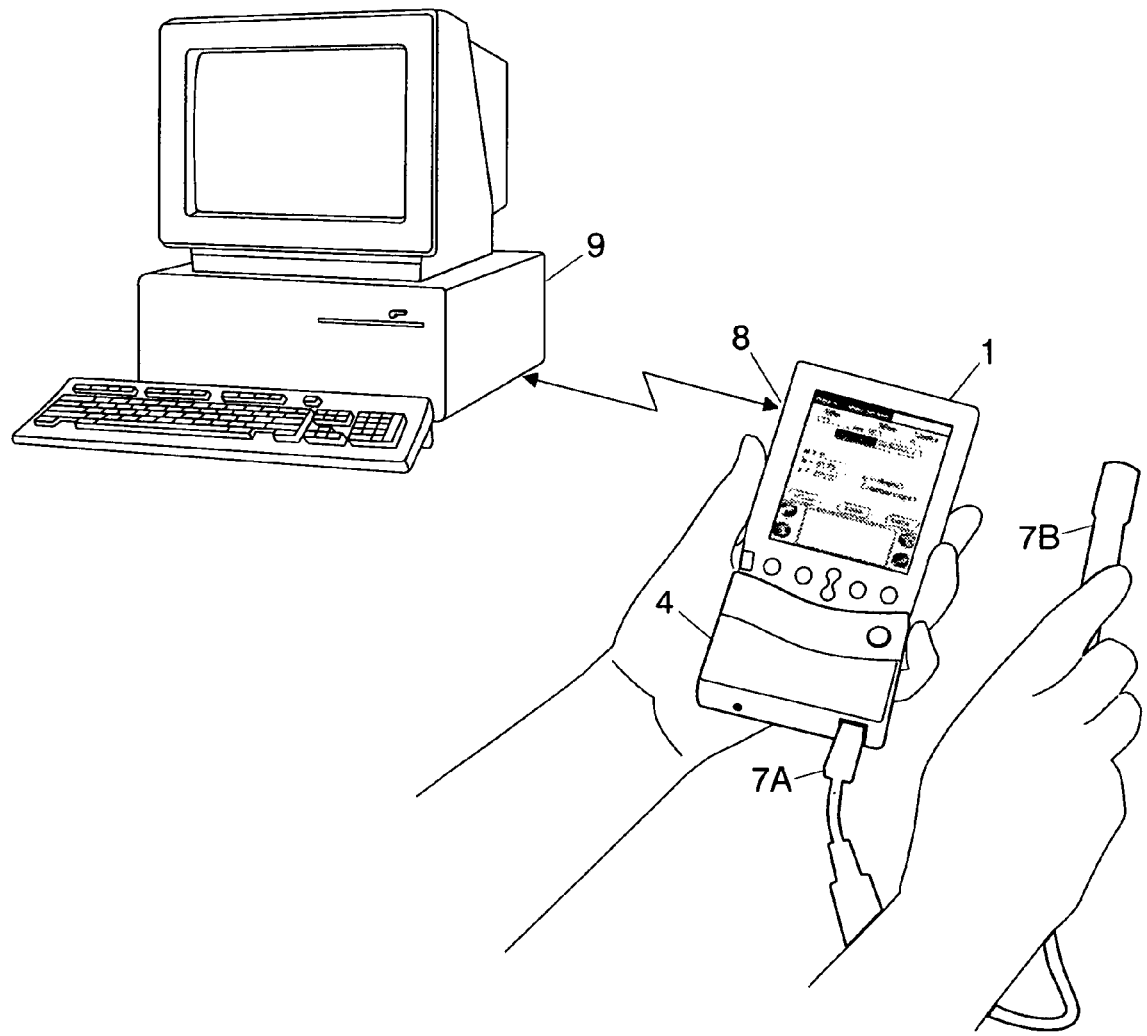
FIG. 4 shows the hand-held computer device (1), with attachable module (4) and an attached digital sensor that plugs into the attachable module at one end (7A) and contains the sensor at the other (7B), using its internal means for connecting (8) to an external computer (9) to communicate either from the hand-held computer device to the external computer or from the external computer to the hand-held computer device. This connection could be by a physical wire (RS-232, serial, parallel, SCSI, Ethernet. Coaxial, even optical fiber) or through non-physical means (electromagnetic, from radio through infrared or beyond), as long as such communicating means are capable of carrying a digital signal between the hand-held computer device and the external computer.
Figure 5:
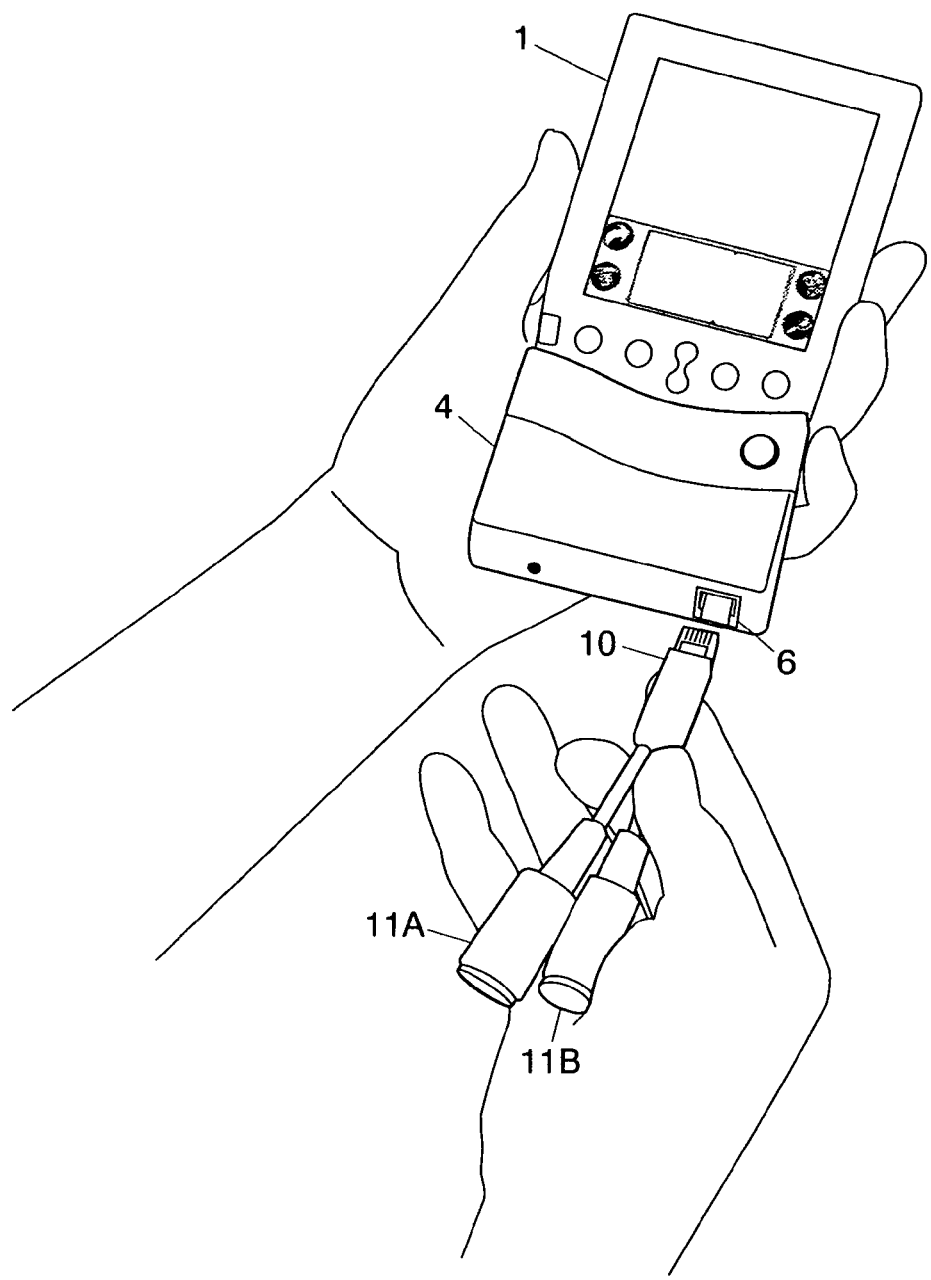
FIG. 5 shows the attachable module (4) through the means for connection to an external sensor (6), can connect to an external sensor that has a plurality of actual sensing elements (11A & 11B).
Figure 6:
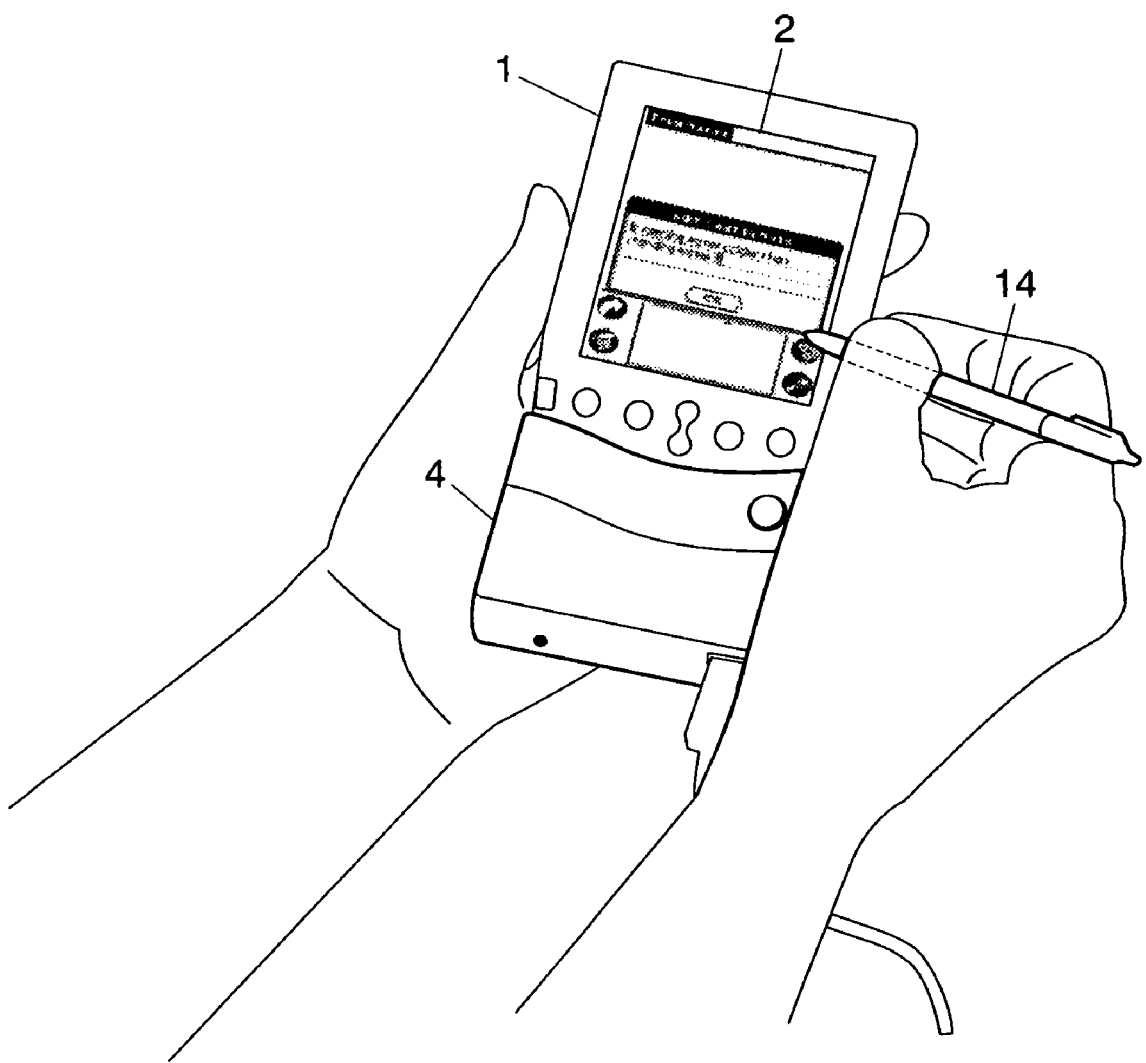
FIG. 6 shows the display screen (2) is used not just to display the data acquired, but to control the process of data acquisition, in this case by using a stylus (14) to interact with the application means governing said interactive data acquisition as they are displayed on the display screen. The displayed controls, dialog boxes, and other elements are governed by the application software means for configuring those controls, which may also govern the meaning and effect of the hardware controls at the bottom of the hand-held computer device.
Figure 7:
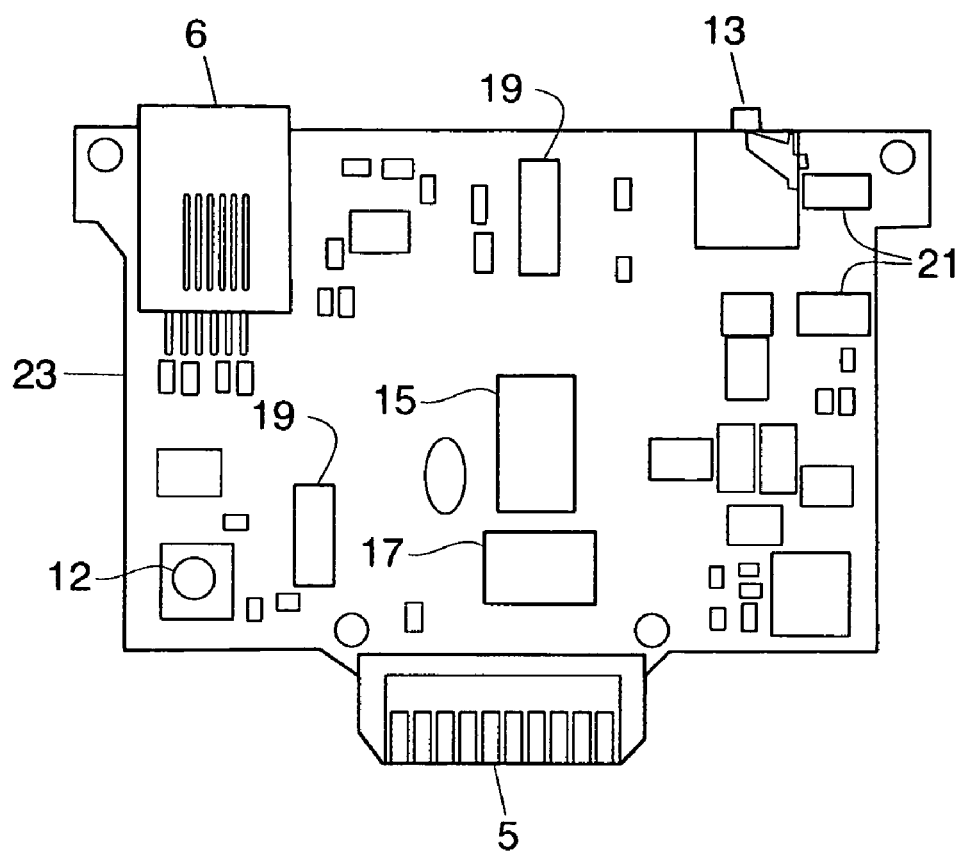
FIG. 7 shows an internal circuit board (23) for the attachable module (4), including the means for connection to an external sensor (6), means for communicating with the hand-held computer device (5), internal power supply connections (21), analog-to-digital converter (15), optional on-board memory (17) that can be read-only programmable, or reprogrammable to enable down loading application-specific software from either the hand-held computer device or an external computer and onboard memory for acquired data (19) prior to communication with the hand-held computer device.
Figure 8A:
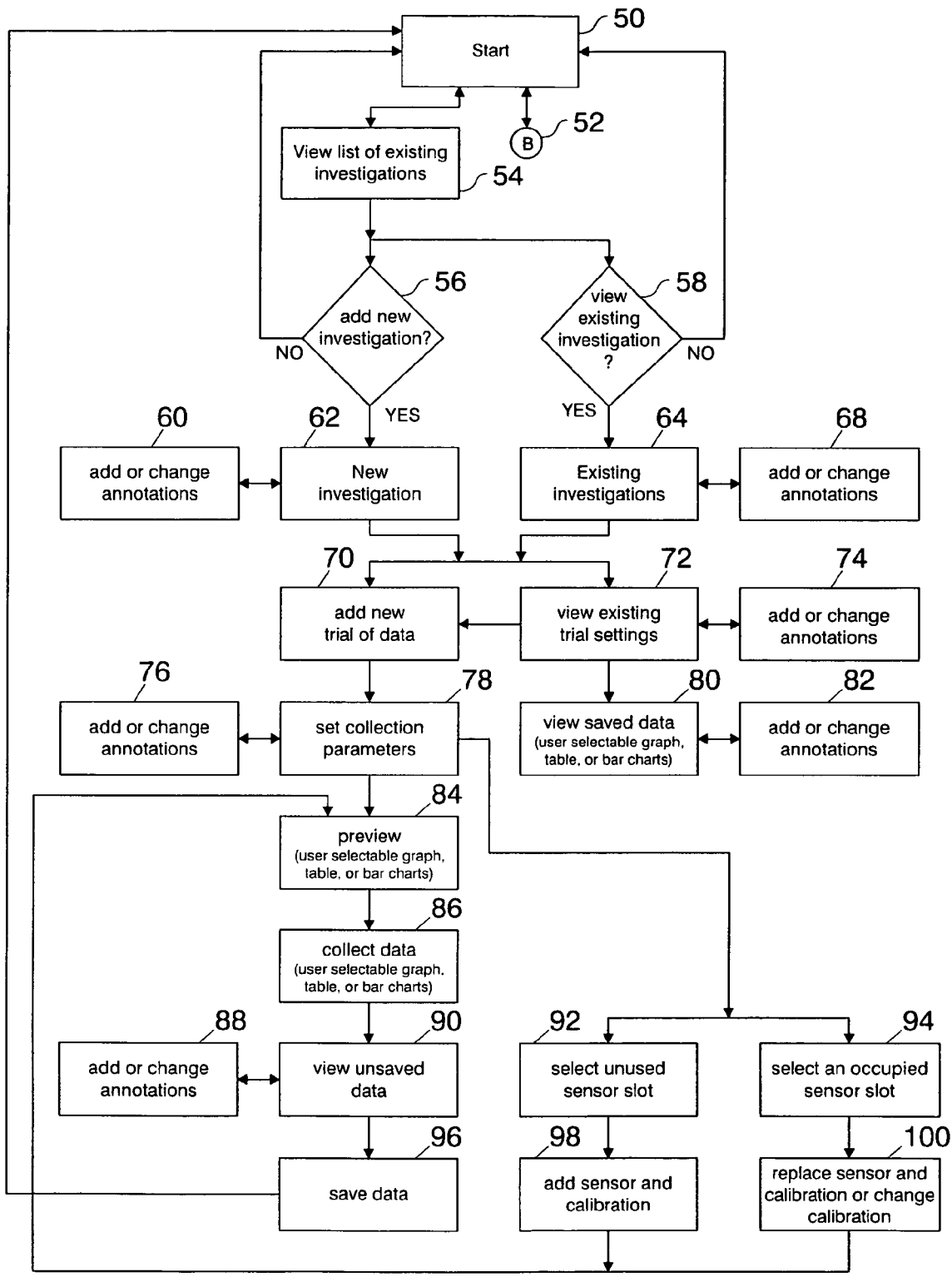
FIGS. 8A and 8B outline the method of using the hand-held computer device, application software, attachable module, and external sensor. On FIG. 8A, on starting to use the hand-held computer device (50), the user may elect to review existing data acquisitions (54), begin a new investigation (56), or view existing sensors (52, which leads to FIG. 8b). Upon starting a new investigation the user may either add a new trial (70) or view existing trial settings (72) and saved data (80). If starting a new trial, the user sets the data collection parameters (78), optionally previews the display format for the data to be acquired (84), and begins acquiring data (86). If the user needs to set the collection parameters, he may add or replace or calibrate a sensor (92, 94, 98, 100) before returning to the preview. After collection, the user saves the data (96) and may begin a new run by returning to the start (50).
Figure 8B:
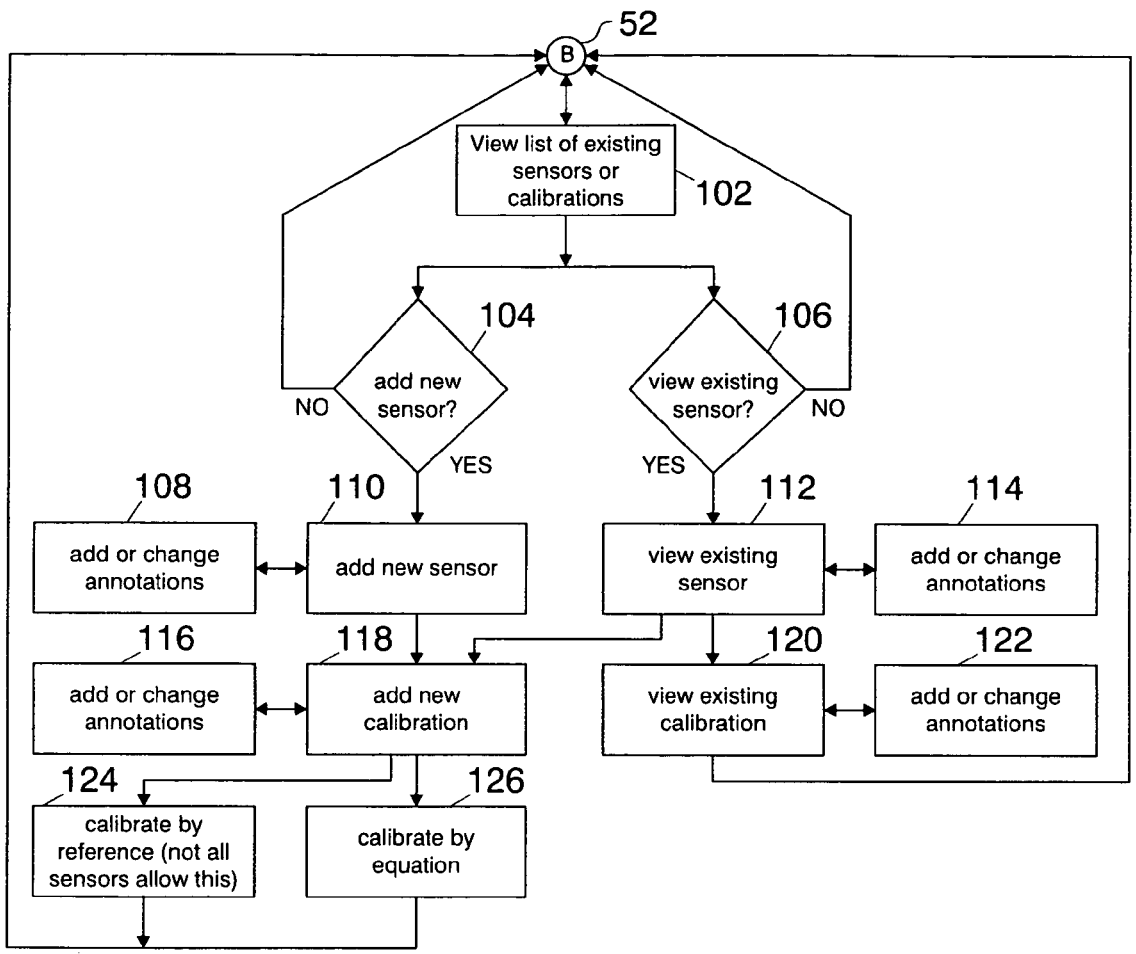
Figure 8C:
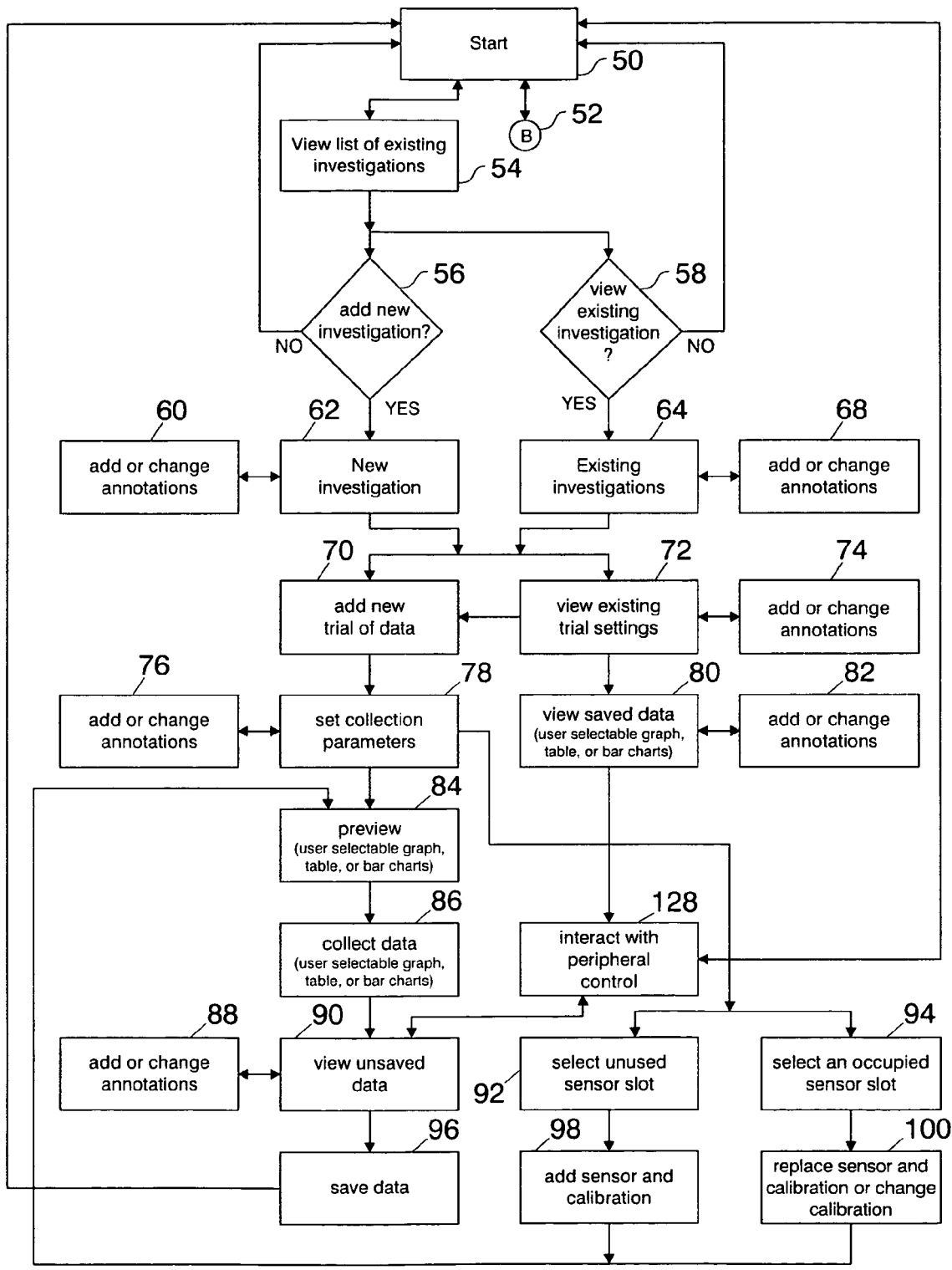

FIG. 8C displays the additional complexity when the additional steps of data analysis (not shown) and interaction with a peripheral control (128) are added. A feedback loop between observation, analysis, and interaction with the peripheral control now can be created (128 goes to 50, 80, and 90).

Figure 9A:
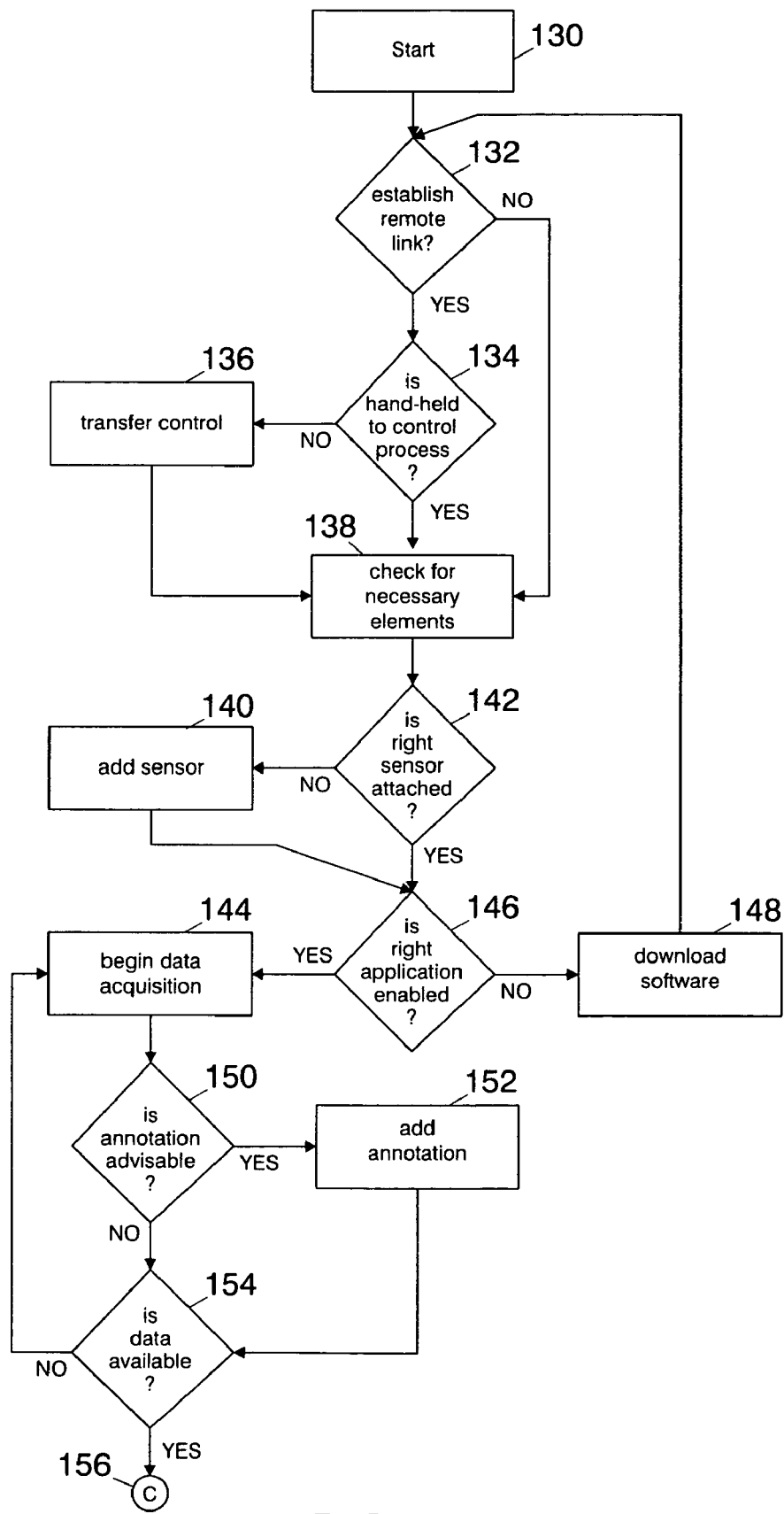
Figure 9B:
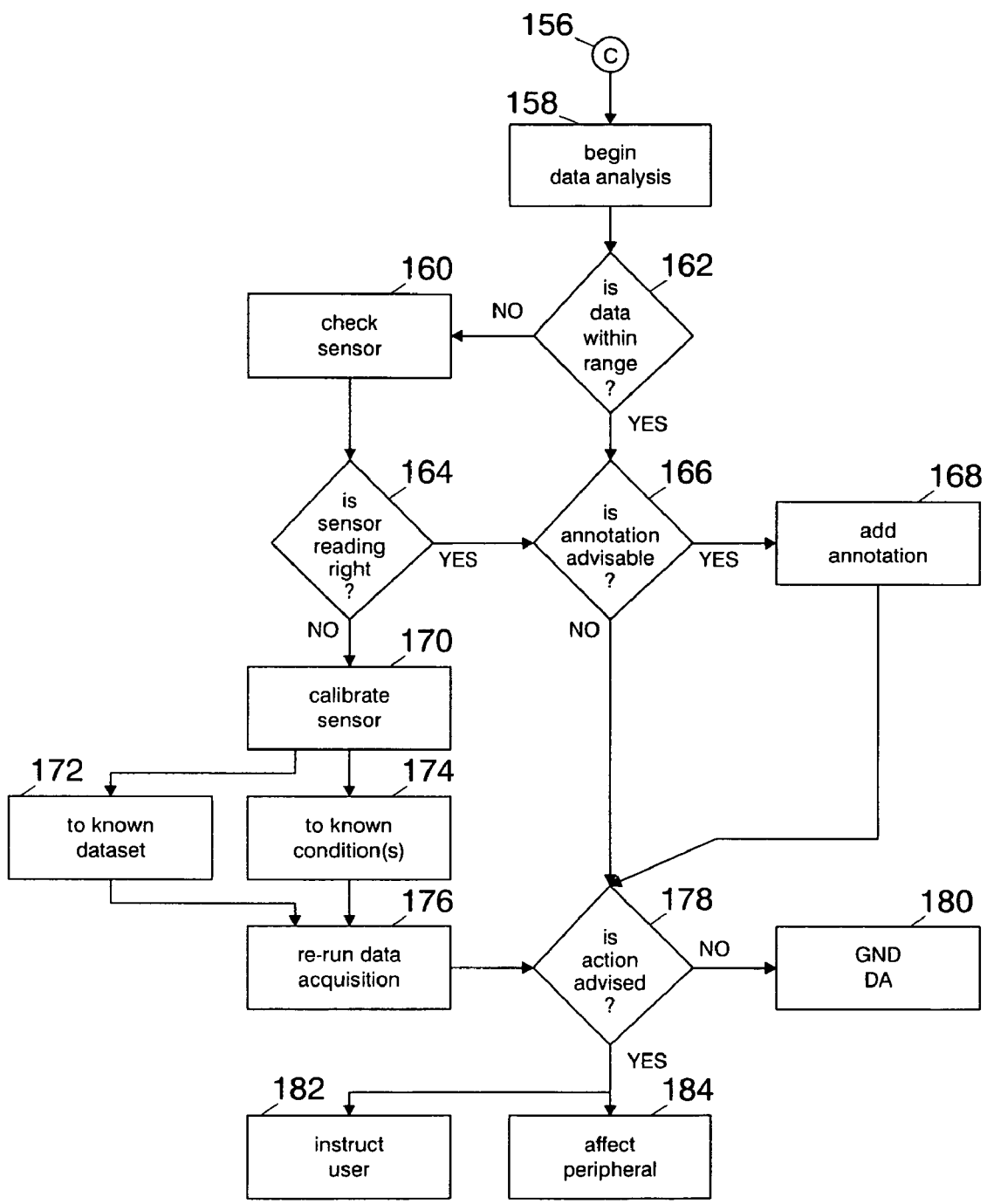

FIGS. 9A and 9B are a more detailed flowchart of the decisions and operations involved in the method disclosed in this embodiment of the invention. From start (FIG. 9A, 130), the user decides whether or not a link between the hand-held computer device and an external computer, or a network of external computers and devices, should be established (132) and. if it is, whether the hand-held computer device is to retain control of the process (136). Before beginning the data acquisition-analysis-interaction cycle, the user checks that the necessary hardware elements are present (138 & 142), adding a sensor as needed (140); checks that the necessary application software is present (146), optionally downloading it from an external source as needed (148); once assured that all necessary elements (hardware, software, and sensor) are present, the user begins the cycle with data acquisition (144). If annotation is advisable, it can be added (150, 152); and, once data is available, it can be further processed, or the data acquisition redone (154).

FIG. 9B starts with the data having been acquired (156, from FIG. 9A), and analysis begins (158). The first determination is whether the data readings are correct (162); if not, then the sensor can be checked (160), and if it is not reading right (164), then it can be calibrated (170), optionally to known conditions (174) or to a known preexisting dataset (172) with an offsetting equation as needed. Again the user may annotate the analysis (166) and, depending upon the results, perform a further action (178). This action may require the user to take particular steps, which the hand-held computer device can instruct him in (182), or require a peripheral device to be affected (184).

Because the application software expands the flexibility of the hand-held computer device, by allowing the set of physical controls to be configured to the needs of the application and the user, and by allowing interactive controls to exist within the display, a series of drawings indicating the type, nature, and effects of the software are included. These, are not meant to be exhaustive as their nature depends upon the particular application and sensor.

Figure 10:
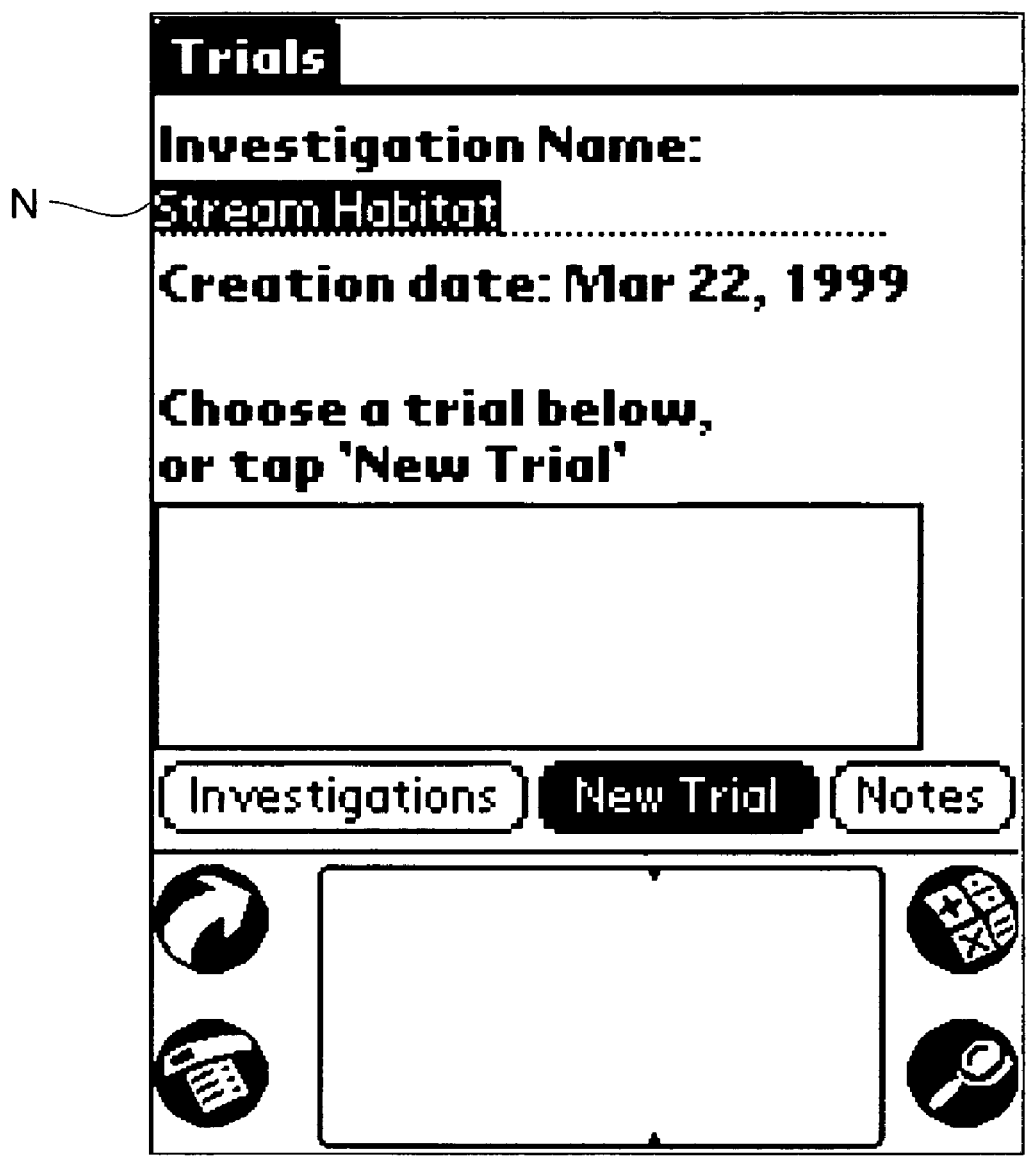

FIG. 10 shows the entry of an annotation identifying the investigation as a whole (N). At the bottom, on the left and right, are standard Palm Operating System controls. In the middle are typical radio button controls ('Investigations', 'New Trial', and 'Notes', with the dark highlighting indicating that 'New Trial' is currently operating). The user could select the radio button by key entry, direct contact if the display screen is touch-sensitive, the use of a special marking stylus, or other means, If the hand-held computer device has an on-board clock it may provide, as in this Figure, a date and time of the Trial.

Figure 11:

FIG. 11 shows the process of entering the Trial Name, with a cursor (ordinarily blinking, but static in this frozen shot of the display) at the end of the text string 'Stream Temp.' The text could be entered through a keyboard attached to the hand-held computer device, by shorthand graffiti for alphabet entries (which is part of the standard Palm Operating System), or many other means. At the left side are a set of radio buttons (N+1) which indicate the condition of the trial before it has begun. Note that the bottom still has the standard Palm Operating System controls.

Figure 12:
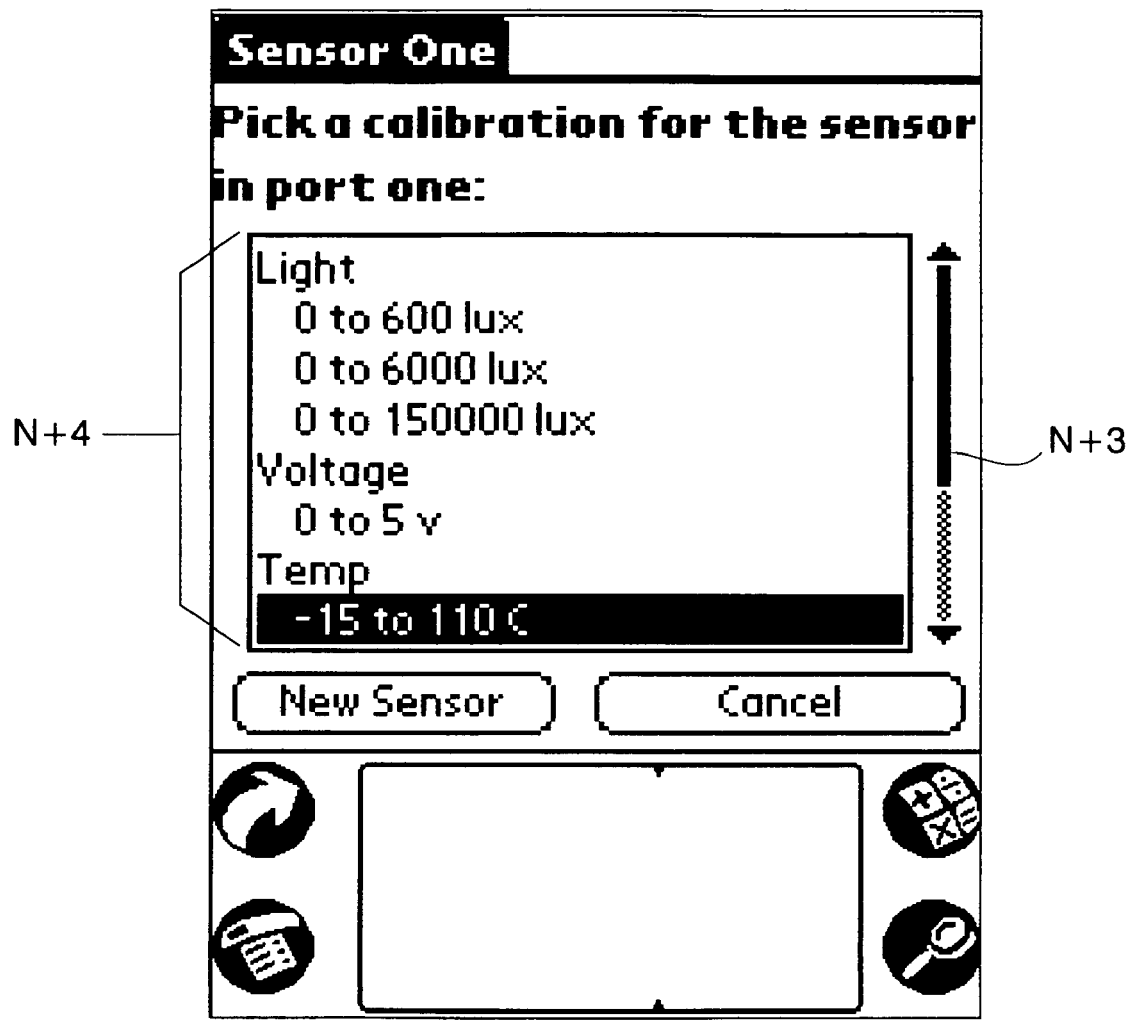

FIG. 12 shows the use of a hierarchical menu (N+4) for selecting the sensor type and calibration (light for example, is calibrated in Lux, while Temperature is calibrated in degrees Celsius, in this figure). A sliding bar control on the right hand side (N+3) allows the user to move up and down within the hierarchical menu.

Figure 13:
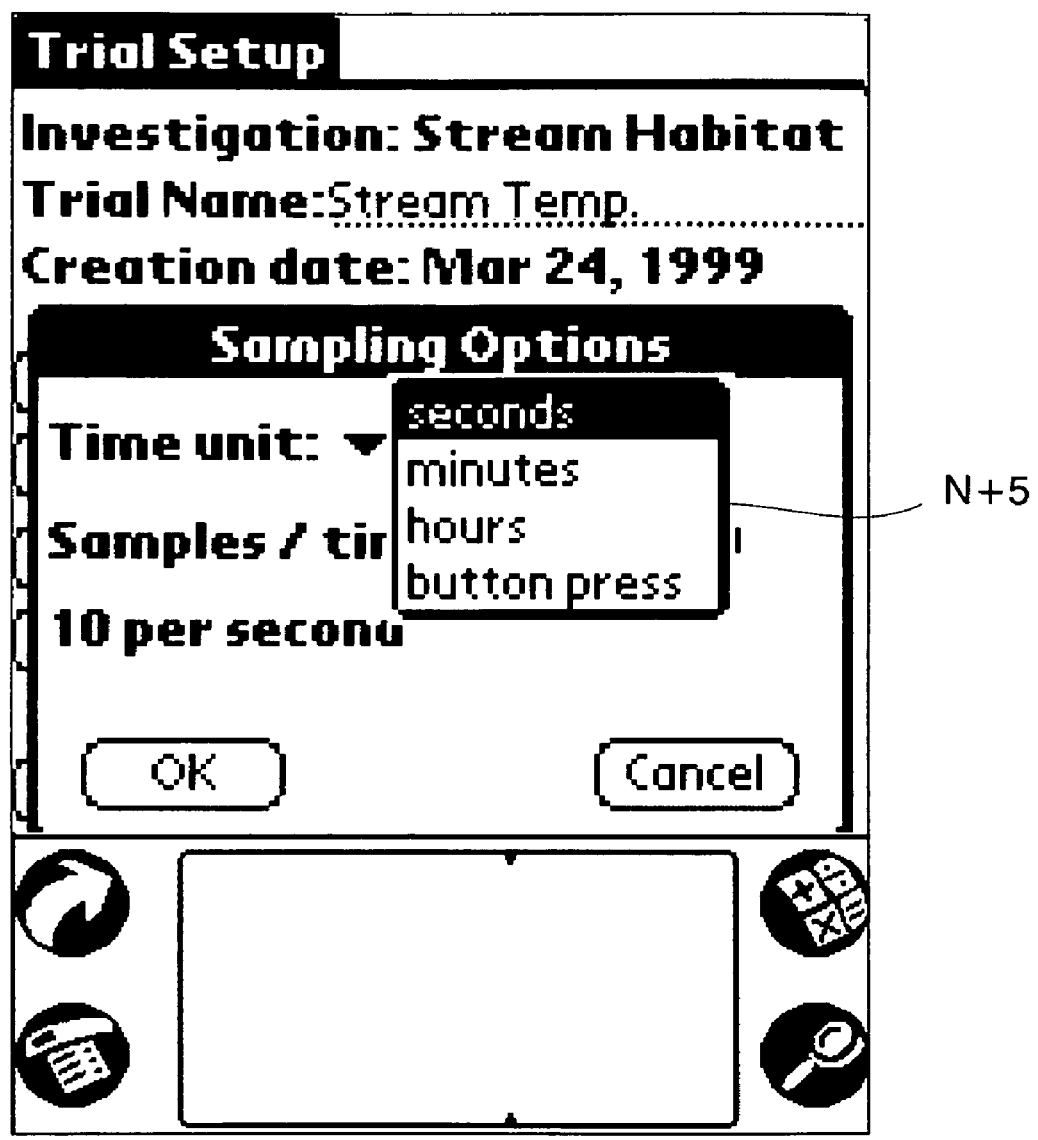

A different display is shown in FIG. 13, where a pop-up menu (N+5) has appeared, displaying the time intervals between samples which can be chosen. The user may use key entry, joypad, or direct stylus interaction to make a selection, depending on the application software capabilities and user's preferences.

Figure 14:
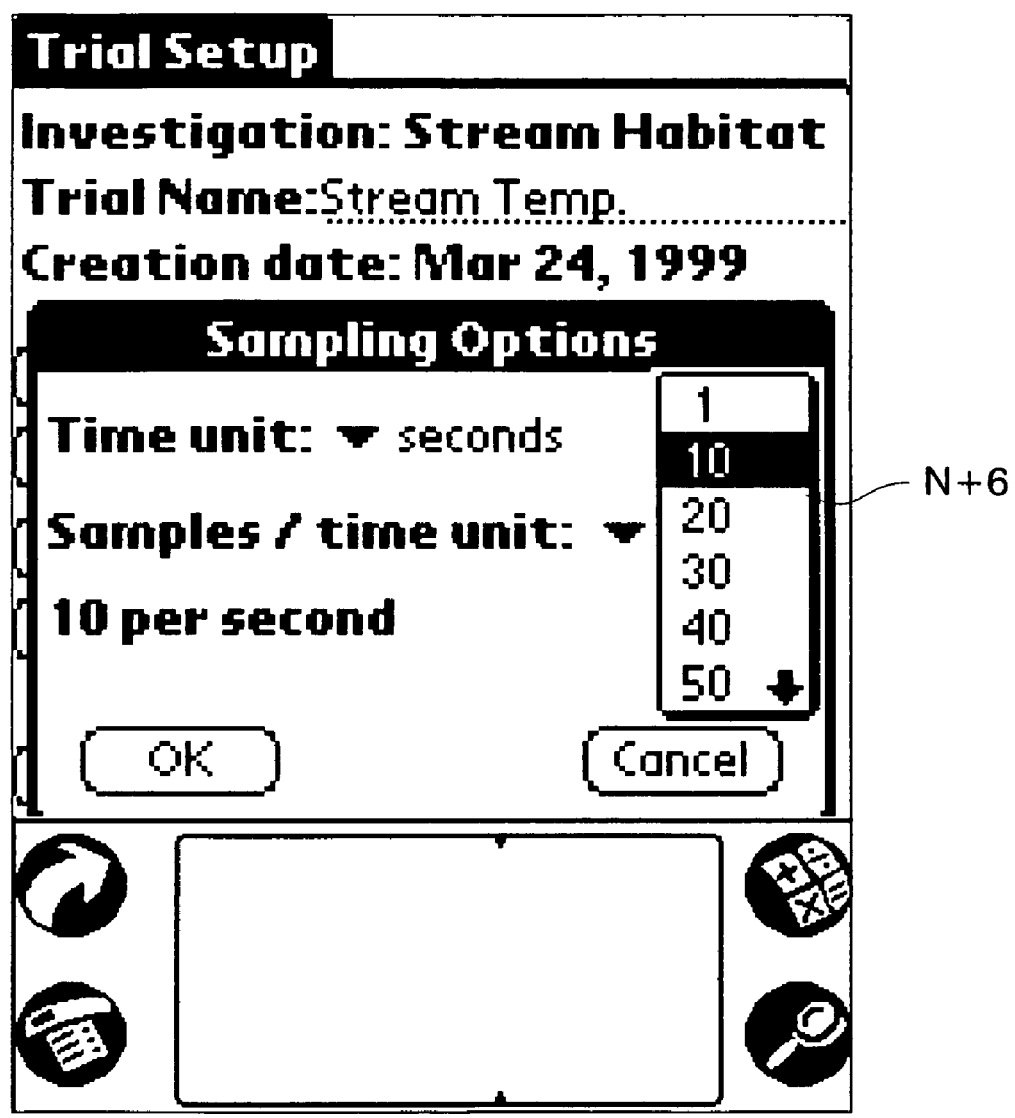

FIG. 14 shows the same style of control (pop-up menu) in (N+6), but used this time to select the sampling rate (samples per time unit). The arrow at the bottom of the pop-up menu indicates more choices than currently displayed exist presumably with increasing numbers, though this is subject to the application software and user's decision (a pop-up menu can be 'circular' where the top and bottom are connected).

Figure 15:
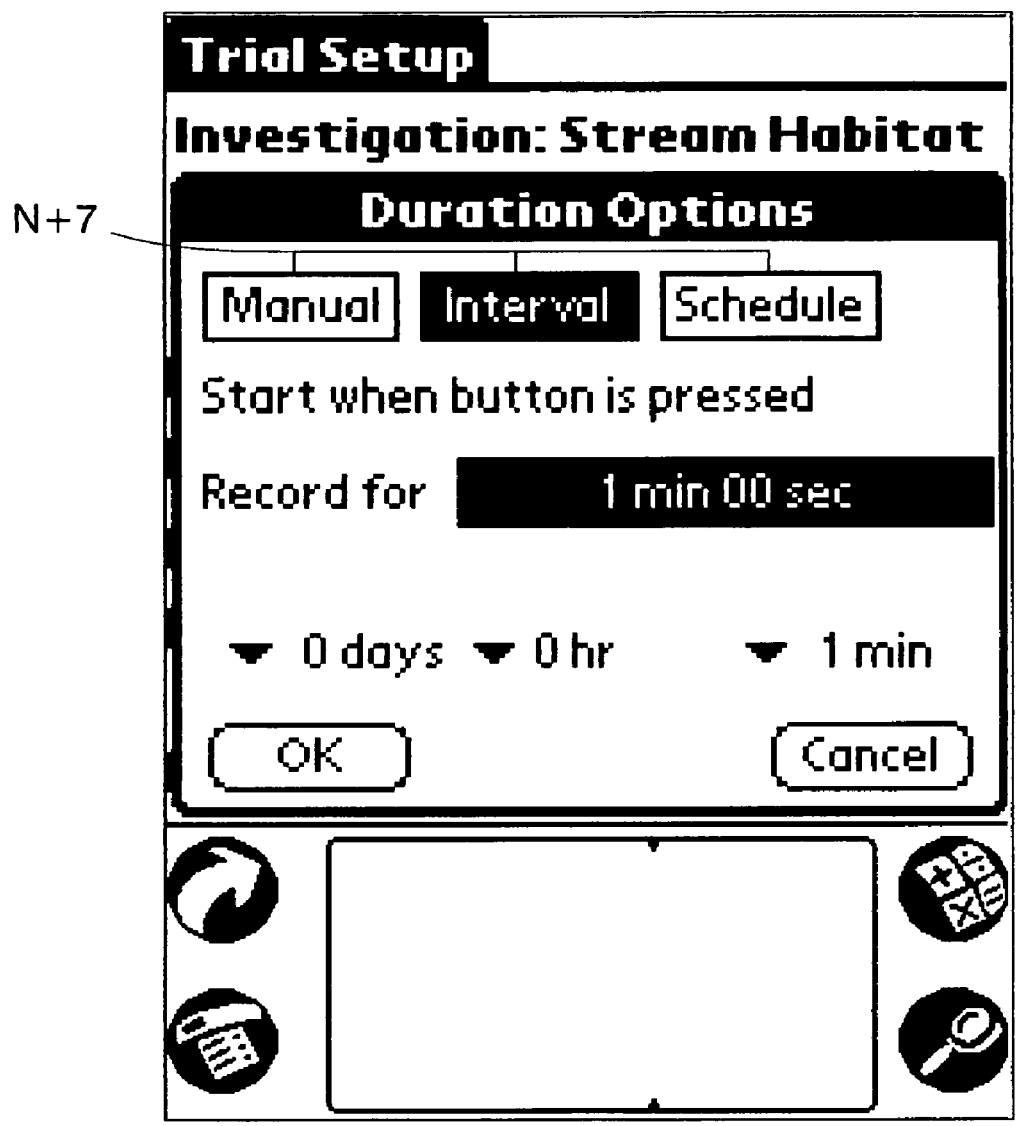

FIG. 15 shows that the user can select whether samples will be taken subject to manual control, at intervals, or according to a schedule (N+7). As the 'Interval' choice is highlighted, immediately below it an interval appears of '1 min 00 sec'. This value could be, dependent upon the previous entry, runs, application software, and user, a default, pre-existing, unalterable, or user-determined value.

Figure 16:
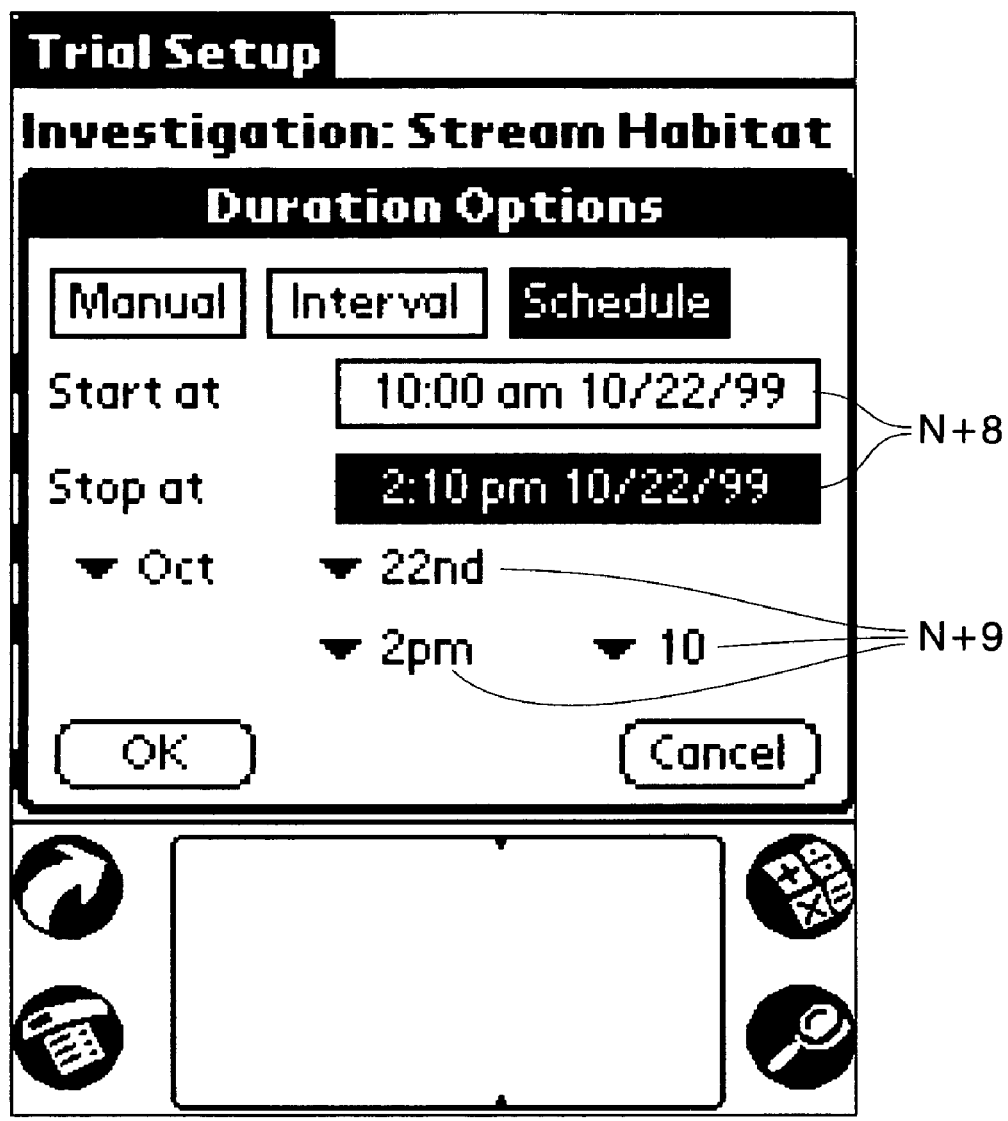

FIG. 16 shows an alternative selection from that displayed in FIG. 15; here the user has chosen the 'Schedule' radio button. The start and stop times are displayed (N+8). with the stop time. shown as currently selected through the dark highlighting, displayed both in one line (N+8) and adjustable (N+9) formats. Other alternatives (not shown) that the application software could use could be clock faces with moving hands, calendars, or moving bar intervals.

Figure 17:
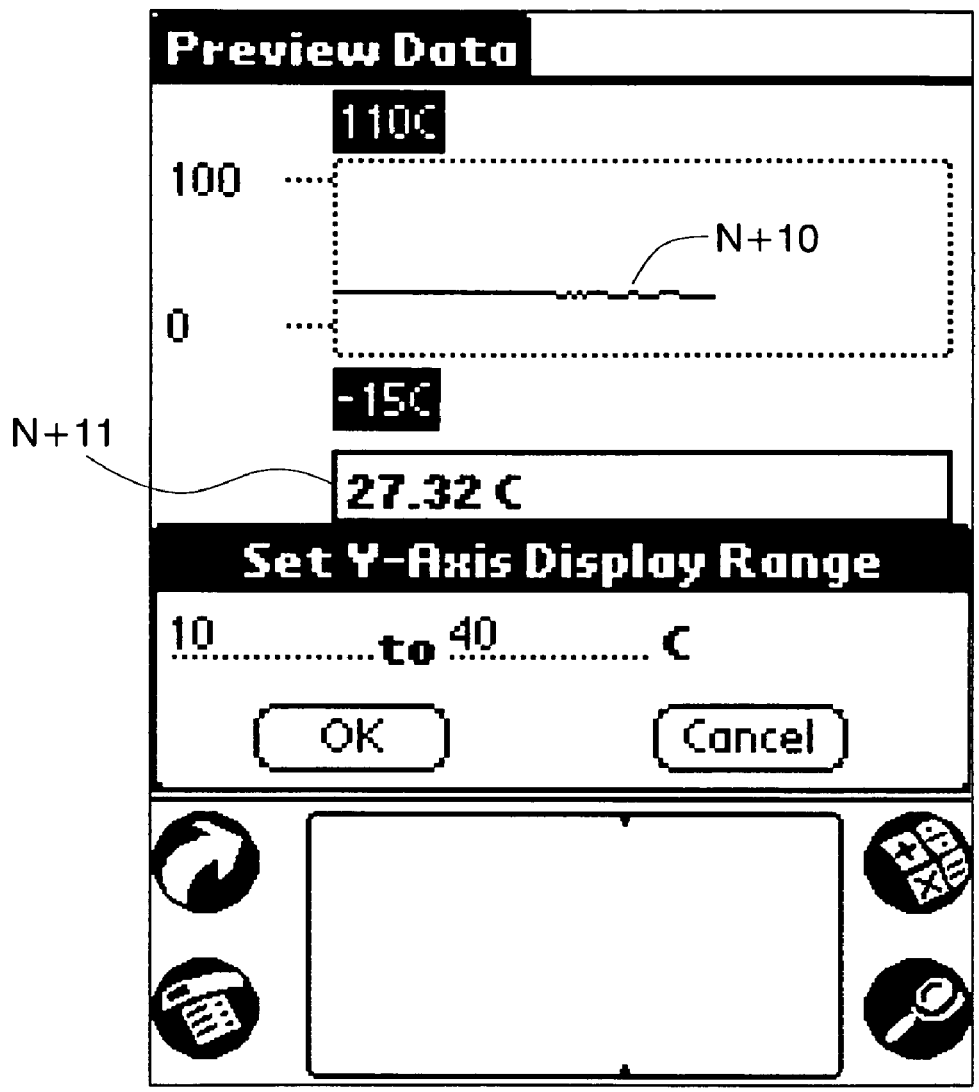

FIG. 17 shows a display of data that has been acquired in a graphical format (N+10) and in a textual format for a selected reading (N+11). Beneath the graph can be seen a pop-up control for resetting the Y-Axis range. In FIG. 17 the range is currently from 0 to 100 C. but the pop-up control indicates that the user is about to change this. narrowing it to a range from 10 to 40 C.

Figure 18:
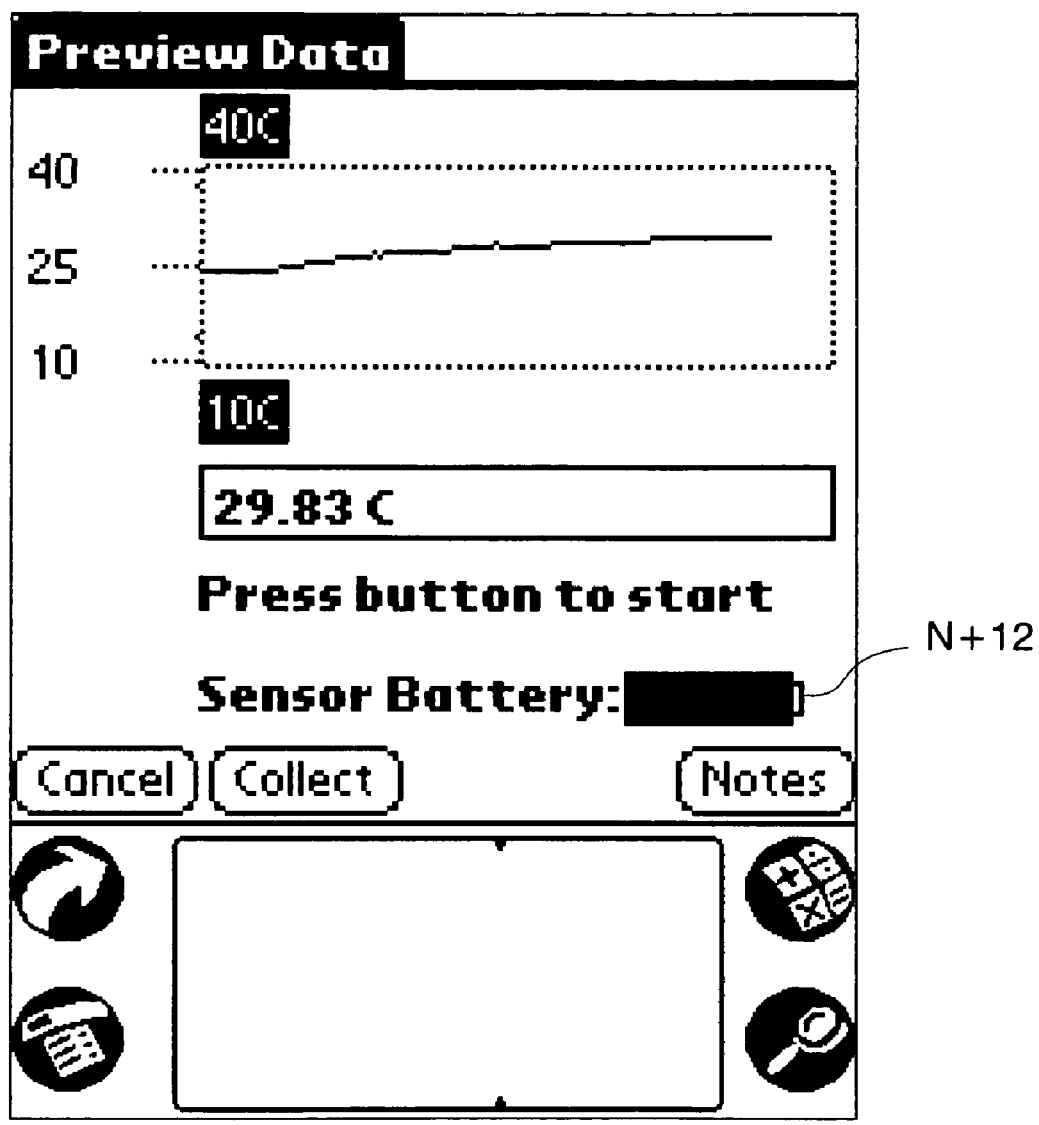

FIG. 18 shows the result of the alteration indicated in FIG. 17. The slope of the line on the graph is much more visible. A new display has also appeared. showing the current state of the sensor battery (N+12), which may affect how the user pursues the data acquisition, analysis, and annotation.

Figure 19:
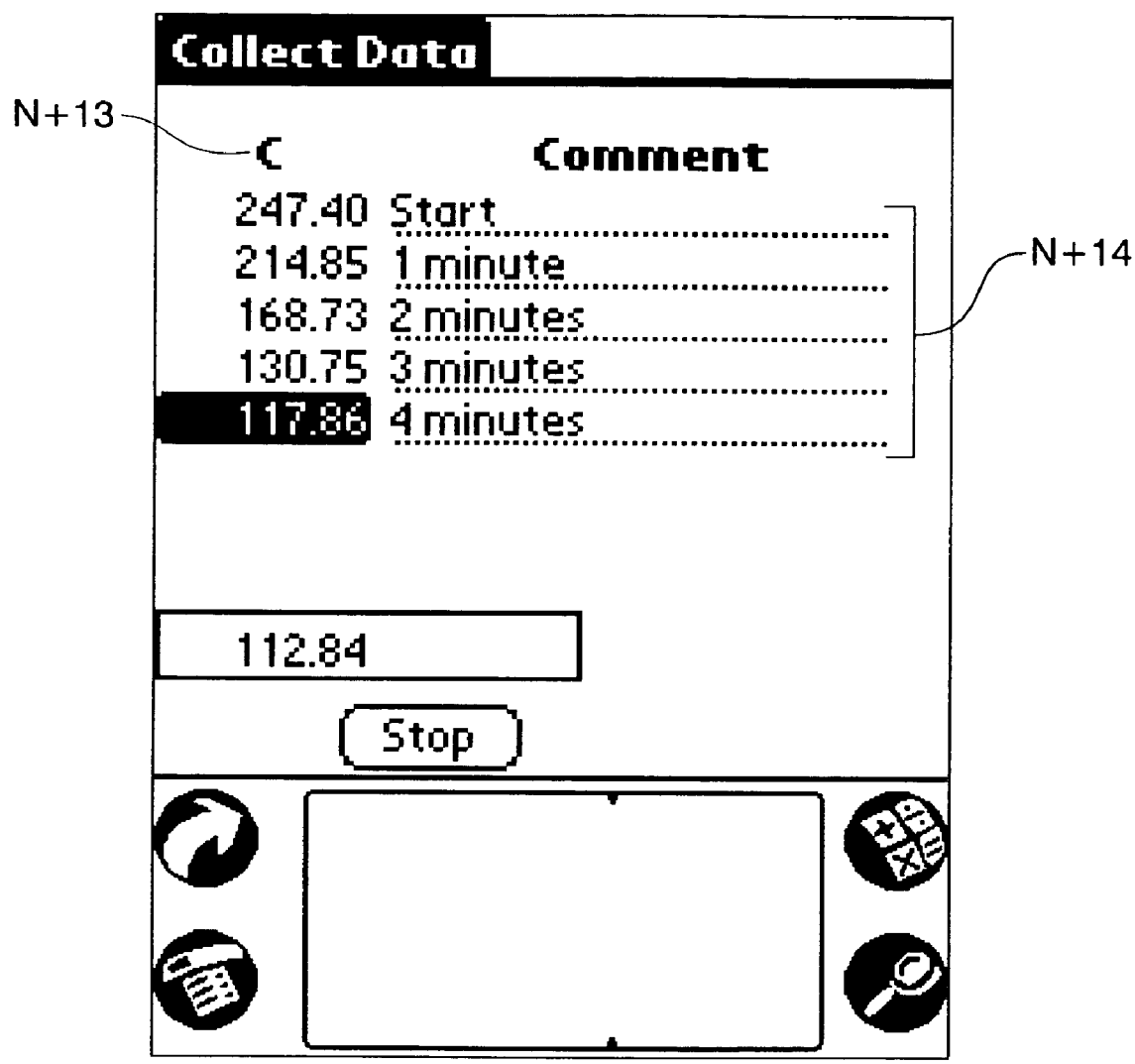

FIG. 19 shows an alternative temperature display; this one is a display of data that has been acquired in a tabular format. On the left side is the temperature in degrees C. (N+13), while on the right side is the time when that temperature was taken (N+14). At the lower, middle left is another figure which could be a current reading, a goal, or an average from a prior run (depending again upon the user. application, and context).

Figure 20:
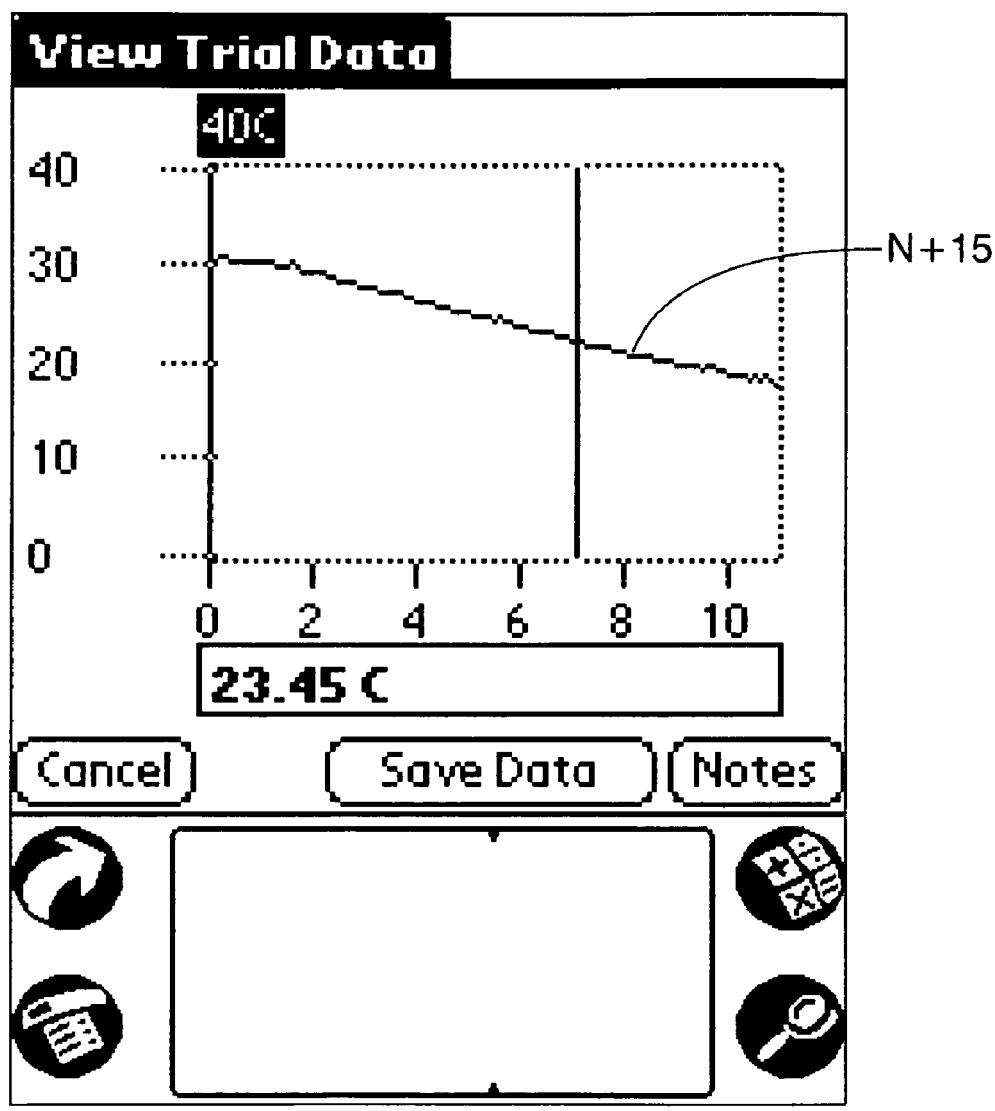

FIG. 20 shows the display of the acquired data in a graphical format, with the current selection indicated by where the intermediate vertical line crosses the declining horizontal line (N+15). Underneath the graph is a single value for the data at that selection, letting a user have a more precise reading (of '23.45 C') than might be obtained from the more dynamically-oriented graphical display.

DETAILED DESCRIPTION OF THE INVENTION

Detailed Description of the Elements

This embodiment of the invention is for a hand-held computer device that includes a display screen, an operating system, a central processing unit, memory for storage of programs and data (both dynamic and static), means for connecting itself to an external computer, a set of controls for user interaction, means for interactive data acquisition, and an attachable module for data acquisition which includes an analog sensor an analog-to-digital converter, and means for communication with the hand-held computer device.

The hand-held computer device (also referred to as a 'shirt-pocket' computer device) contains in one compact and lightweight package the entirety of the operating system/ input/display/recording/programmable and long-term memory features of any general-purpose and interactive computer that, with the loading and operation of the appropriate application software, can become any of an expandable set of specific-purpose tools. As the hand-held computer device is both readily portable and fully functional, it combines into one exceedingly useful and accessible package the heretofore separated sensor/computer/display/input-output functional elements that allow the mixing of the best of human adaptivity and computer precision. It can be carried where a laptop cannot. And, because it has such a minimalist weight and bulk penalty, it will be carried when heavier, bulkier, more exhausting and more awkward combinations are left behind.

Because this embodiment of the invention has a display screen, the user/observer of the hand-held computer device has a view into the ongoing process. whether that be of data acquisition or analysis of the results. Without such a 'window' (presumably the generic term is still within the public domain) on the process, none of the benefits of synergy or interactivity are possible. The display, moreover, is one that is modified by the software—which is discussed in further detail below.

Because this embodiment of the invention has an operating system, central processing unit, and memory for storage of programs and data, it can do more than one particular task, and retain the results for more than one observational run. Moreover the hand-held computer device can use application software to compare and analyze observational records. These processes, and the results, can be displayed as they occur via the already-mentioned display screen. Which can mean that an intelligent human observer may be able to perceive patterns or trends in ways that the computer has not yet been programmed to do, even in the middle of a series of observations. Which, in turn, can lead to on-the-spot decisions that benefit the observer, the record, and the process. For example, a human observer might note that soil pH readings link with a particular flora in the Amazon rainforest, and actively seek out or avoid areas with a higher density of such plants. Or a disturbing trend in chemical analysis, though it has not yet led to a disruptive event, may alert the observer to the potential for a crisis before it erupts, allowing him to either leave or intervene to prevent it in the first place.

Because the hand-held computer device has means for connecting itself to either an external (but. please note, not necessarily a host) computer, or a network (which in turn may include multiple computers, peripherals, or other hand-held computer devices), two major advantages ensue. First, the flexibility of the hand-held computer device is not limited to its memory capacity, as the desired application software can be transferred from outside.

A crucial distinction between this embodiment of the invention and several others disclosed above is that the hand-held computer device, as it has the general flexibility of any computer, can and does use the software to modify its controls to the needs of the application and the user. The display on the display screen can similarly be modified by internal software fitted to the user's need. As these controls include any software-configurable input (or output) means, the device is no longer a Procrustean bed that forces the user to its limitations; but, rather, a user-friendly and adaptive tool that can be modified to meet the needs of the user at the moment.

For example, one user may feel most comfortable using a stylus and alphabetic listing to activate an iconic software control or to 'pick out' annotative notes. Another may wish to use a particular stylus-driven alphabetic shorthand (or even the aged Gregg shorthand, depending only on finding a software implementation thereof). A third may wish to use layered menu choices, while a fourth may prefer a hierarchical tree of possible interactions.

Some users may wish the controls or the process (as opposed to the controls for, say altering the scale of the display) to be displayed on the screen for direct interaction. This embodiment of the invention permits that; moreover, it would allow (as long as the enabling software has been loaded) a user to specify which controls appear on the left, right, top, bottom, or center of the display screen. Not everyone wants the 'trash can' at the bottom right corner of their display! Enabling that flexibility of the user interface and surpassing the physical limitations of any device's hardware is a significant aspect of this embodiment of the invention. Others may want the controls to be linked in a particular fashion to the hardware controls available on the hand-held computer device. Others may want to change the alphabet, or even the language—and again, as long as the enabling software has been loaded onto the hand-held computer device, they may get what they want or need.

Furthermore, the controls needed will depend in part on the task(s) to be performed. Taking a series of temperature readings? Do you want the results to be displayed in Celsius, Kelvin, or Fahrenheit? Do you want readings every second, every tenth of a second, or every 10 seconds? Do you want a bar graph, a linear graph, or a maximum/minimum range over the total observations displayed? Because there are means for interactive data acquisition, the user and the use together determine the set of controls, their layout, and their usage and effect. Change the task, however (soil pH, or blood glucose level, or light intensity), and the controls and interactions may need alteration as well—alteration which is driven by the application software, running within the limitations of the hand-held computer device's operating system and hardware controls.

Because the hand-held computer device also includes means for interactive data acquisition by its user, the user of the hand-held computer device is also the observer (due to the display screen. central processing unit, and memory) of the data acquisition process, able to interact with the process (thanks to the set of controls), and can use the entirety for any of a wide variety of specific purposed when combined with the appropriate attachable module and application software, as detailed below. Once again his actions, decisions, and observations become part of the entire process. Rather than having analog sensor, digital recording, computer analysis, human contextual observation all separated, this embodiment of the invention joins them all together in a process of synergistic, context-sensitive interaction that uses the best strengths of both humans and computers.

Because a particular attachable module can be configured to a particular task, while a wide variety of possible observations and interactions can be enabled through the appropriate set of attachable modules, this embodiment of the invention maintains the flexibility and adaptivity of the general-purpose computer. As the attachable module contains both an analog sensor and an analog-to-digital converter, and means to communicate with the hand-held computer device, the entire combination retains its adaptivity subject solely to the potential software limitations of the particular hardware. No longer would a technician necessarily have to carry three different sensors with varying levels of sensitivity, if a software filter can be devised to adapt the raw analog data to the appropriate digital output. One sensor can be set to detect, for example, a range of lumens from 1 to 1,000, while the same sensor can be programmed on the next run to detect a range of lumens from 500 to 5.000. Any sensor that measures within the limitations of the hand-held computer device's and attachable module's hardware and software (in the best embodiment these are from 0 to 5 volts with power requirements not exceeding 200 mA) can be attached, and these already include at least the following: accelerometer, barometer, biology gas pressure sensor, calorimeter, $CO_2$ gas sensor, conductivity probe, current and voltage probe, dissolved Oxygen probe, EKG sensor, flow rate sensor, heart rate sensor, light (presence, intensity), magnetic field, pH, pressure, relative humidity, respiration, force, thermocouple, and voltage sensor.

In the best mode, the hand-held computer device further includes an internal on-board clock which the operating system and application software can integrate into an application, to allow a user to view time-based observations or to enter as part of user-driven annotation. This allows the data acquisition to be driven by relative time (intervals of length x between observations) or by absolute time (readings to be taken at time X GMT). The hand-held computer device also has an on-board battery rendering it independent of external power sources, and can obtain power from and provide power to external connections, including the capability of providing power to the attachable module, which in turn can provide power to the attached sensor within certain ranges.

As the hand-held computer device has both the capabilities of its internal memory, cpu, and display, and can communicate with an external computer, this embodiment of the invention is capable of running an expert system software program that can guide the user or data analysis interactions, with the location of the software depending upon that program's memory or that communication means' transmission limitations.

How the Invention is Used

When carried into the field by the user, the hand-held computer device (in the best embodiment, a Palm-based operating system hand-held computer such as the Palm Pilot or Handspring Visor), attachable module, and external analog sensor are combined with the appropriate application software, so the user had the means for data capture, analysis, annotation, and calibration (of the sensor or analog-to-digital translation) as necessary for immediate, interactive, and synergistic observation, analysis, annotation, and action. Data readings are taken in a one or more trials (or experiment runs). As the observations progress the user is able to annotate the process. the results, or even the actions taken both within and without the hand-held device's limitations. The user may choose to control the data acquisition process manually, with inputs being taken each time he activates the sensor; or he may set up a series of observations which will then be run by the hand-held computer device. The interval between observations, the scale of measurement, the sampling rate, and the measurement units may be selected by the user through the controls physically present in the hand-held computer device or as virtually present through the display screen if it has been made interactive.

Additionally, the user may view the data as it is acquired, changing the display on the display screen to meet his needs. He can alter the scale, select an individual reading or set of readings, move the time interval displayed (forward or backward), or even change the trial currently being displayed. Annotations may be entered linked to particular observations, to a trial, or to the process as a whole, which allows the user to add to the observations of the data observations on the process, and to add to the analysis observations on the analysis, the results, or the process. Anyone of the annotations may include elements within the power of the human user that are not within the existing limitations of the hardware and software he is using. Light sensors may be affected by clouds or by the temporary shadow of a moving object in the environment (such as a jetliner flying overhead) which was not predicted when the trial was first proposed; yet by annotating the event otherwise anomalous or difficult data readings may be accounted for.

Furthermore, if there is a need for more than a particular sensor (more than an individual sensor, or more than one type of sensor) to jointly cooperate and interact, this embodiment of the invention allows them to be conjoined via any network. The network in turn could be monitored or driven by any particular hand-held computer device or by any intermediary computer; alternatively, the intermediary computer or other hand-held computer devices could be used to provide additional processing power or memory under the direction and control of the single hosting hand-held computer device. Therefore this embodiment of the invention includes the method of using a human plus a hand-held computer device with an attachable module with the appropriate sensor and application software to take necessary scientific, technical, or other instrument readings in one or a series of observations, and then, in a further extension, in using the same human plus computer combination to interact with the environment under the direction of any software-based or human-based advice communicable through the network to the individual human on-the-spot where the readings are being taken. For example, a low-level medical technician may use a hand-held computer device with the attachable module with its sensor, and application software, to track the blood glucose level of a borderline diabetic patient. Upon receiving a reading which is out-of-bounds (too high or too low), the technician could be alerted through the hand-held computer device to administer the appropriate corrective treatment.

Additionally, if the attachable module and application software are properly configured (which may be done by downloading from an external computer the appropriate software) the hand-held computer device and attachable module may be used to drive a direct interaction with a further peripheral connected to the outlet(s) of either the attachable module or the hand-held computer device itself. For example, a small group of technicians may be sent along a stream in which a pollution trace must be followed, which runs parallel to a pipeline. Upon finding the greatest concentration of the pollutant with the upstream not being polluted, that individual can be directed to the pipeline where, either through expert-system advice communicated through the hand-held computer device or, through software empowering an attachable module that can be linked to the pipeline controls directly, the closest upstream valve to the pipeline can be closed to shut down the leak causing the pollution.

Specific Embodiments and Examples

The preferred embodiment of this invention uses as its hand-held computer device with central processing, memory, and display unit a commonly available platform such as the Palm Pilot (available from 3Com Corporation) or the Visor (available from Handspring Corporation), either of which uses the Palm Operating System for its basic operating system software. These also permit communication with external computers through ASCII text and browsable HTML files, and link with such commonly available external computers as PC-compatible. Windows OS based (95/98 or NT) personal computers of Macintosh (Mac OS 7.5.3 or greater) personal computers, commonly available.

There are a number of analog-to-digital sensors that have already been created and available on the marketplace from a variety of vendors. Any sensor that measures in the range of 0 to 5 volts, with power requirements that do not exceed 200 mA, or have their own power source, and provides an input signal as specified by the application software or Palm Operating System, can be used. These sensors should have 2 input channels, a modular 'telephone jack' connector (DIN-5 adapters are commonly available), permit user configurable sampling rates of up to 400 samples per second for 1 sensor or 200 samples per second for 2 sensors, have a 12 bit resolution, and an input voltage range of 0 to 5 volts, single ended. A sample of the governing software for translating analog-to-digital signals from a sensor to the handheld computer device can be found in an article published by Gary T. Derosiers. "Pilot Hardware Add-Ons", Handheld Systems 6.4, July/August 1998.

Among the specific embodiments and examples are the use of a Palm Pilot, a sensor, and an attachable module and application software for detecting the pH of a liquid sample to assess water quality and trace variations through a stream; the use of a Palm Pilot, a sensor, and an attachable module and application software for detecting heartbeats for monitoring, athletic activity; the use of a Palm Pilot, a sensor, and an attachable module and application software for detecting acceleration changes during rides (thereby allowing assessment of curves and possible metal stresses); the use of a Palm Pilot, a sensor, and an attachable module and application software for detecting light to evaluate photographic conditions, light leaks, or office cubicle conditions; and the use of a Palm Pilot, a sensor, and an attachable module and application software for detecting temperature to assess the efficiency of particular insulation and radiation placements in design of an office or home.

Closing

Although the present invention has been described in considerable detail with reference to certain preferred versions thereof, other versions are possible. As long as analog readings from an external sensor can be converted to digital signals, the combination of hardware and software in the appropriate attachable module for that sensor makes the entire combination with the hand-held computer device feasible. One could add to the list of sensors above, for example, radiation monitors, particular chemical sensors, biological sensors (DNA or gene-fragment presence/absence), weight, bar code, inventory tag, infrared, motion—if the attachable module can be created and then the sensor plus module joined to the hand-held computer device, the observer can bring the strength of computer analysis to the flexibility of human contextual assessment together in an interactive fashion, using this embodiment of the invention. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features using the same, equivalent or similar purpose, unless expressly stated otherwise. Thus, unless expressly stated otherwise, each feature disclosed is one example only of a generic series of equivalent or similar features.

We claim:

1. A handheld computer device comprising:
 a hardware interface attachable to the handheld computer device and couplable with at least one attachable sensor, the at least one attachable sensor to perform data acquisition when attached to the hardware interface and be programmable by the handheld computer device;
 a data module to interact with the sensor and with the handheld computer device; and
 a display module to display data collection results on a display of the handheld computer device, the display module providing a user interface to allow users of the handheld computer device to interact with the handheld computer device during the data acquisition.

2. The device of claim 1 further comprising a memory module to store data supplied by the at least one sensor.

3. The device of claim 1 wherein the data module further configured to calibrate the at least one sensor.

4. The device of claim 1 further comprising an alert module to notify a user of the device of an event based on data provided by the at least one sensor.

5. The device of claim 1 further comprising a power source.

6. The device of claim 1 wherein the at least one sensor comprises a sensor for assessing chemical composition of a liquid sample.

7. The device of claim 1 wherein the at least one sensor comprises a sensor for monitoring athletic activity.

8. The device of claim 1 wherein the at least one sensor comprises a sensor for detecting acceleration changes.

9. The device of claim 1 wherein the at least one sensor comprises a sensor for detecting light.

10. The device of claim 1 wherein the at least one sensor comprises a sensor for detecting temperature.

11. The device of claim 1 wherein the at least one sensor comprises an analog sensor.

12. The device of claim 1 wherein the at least one sensor comprises a digital sensor.

13. The device of claim 1 wherein the data module includes an analog-to-digital converter.

14. The device of claim 1 wherein the data module processes the data prior to display of the data collection results on the display.

15. A handheld apparatus comprising:
a handheld computer device;
an attachable sensor to perform data acquisition; and
an adjustable module attachable to the handheld computer device and couplable with the sensor, the adjustable module processing data received from the sensor and causing the data to be displayed on a display of the handheld computer device, the sensor to perform data acquisition when connected to the adjustable module and be programmable by the handheld computer device, the display presenting a user interface allowing users of the handheld computer device to interact with the handheld computer device during the data acquisition,
wherein when the adjustable module is attached to the handheld computer, a combination of the adjustable module and the handheld computer has a handheld size.

16. The apparatus of claim 15 wherein the sensor is an analog sensor.

17. The apparatus of claim 15 wherein the sensor is a digital sensor.

18. The apparatus of claim 15 wherein the adjustable module includes an analog-to-digital converter.

19. The apparatus of claim 15 wherein the adjustable module further calibrates the sensor.

20. The apparatus of claim 15 wherein the adjustable module further generates graphical representation of the data received from the sensor.

21. The apparatus of claim 15 wherein the adjustable module further directs the sensor to change data collection features of the sensor based on at least one user instruction.

22. The apparatus of claim 15 wherein the adjustable module further alerts a user of the apparatus of an event based on data received from the sensor.

23. The apparatus of claim 15 wherein the sensor is a sensor selected from a group including a temperature sensor, an acceleration sensor, a radiation sensor, a chemical sensor, a biological sensor, a weight sensor, a bar code sensor, an inventory tag sensor, a motion sensor, an infrared sensor, a pH level sensor, a heart monitor sensor.

24. A method comprising:
receiving data from an attachable sensor connected to an attachable device, the attachable sensor performing data acquisition when connected to the attachable device, wherein the attachable device is attachable to a handheld computer device, and the attachable sensor is programmable by the handheld computer device, and wherein when the attachable device is attached to the handheld computer, a combination of the attachable device and the handheld computer has a handheld size;
processing the data at the attachable device;
allowing users of the handheld computer device to interact with the handheld computer device during the data acquisition; and
providing results of the processing to the handheld computer device for display.

25. The method of claim 24 wherein processing the data includes generating graphical representation of the data.

26. The method of claim 24 wherein processing the data includes converting the data into digital form.

27. The method of claim 24 wherein processing the data includes determining whether an event occurs.

28. The method of claim 27 further comprising generating an alert signal to display at the handheld computer device if the event occurs.

29. The method of claim 24 further comprising calibrating the sensor based on at least one instruction of a user.

30. The method of claim 24 further comprising annotating the data based on at least one instruction of a user.

31. The method of claims 24 further comprising changing options of the sensor based on at least one instruction of the user.

32. The method of claim 31 wherein the options include sampling rates.

33. The method of claim 31 wherein the options include a scale of measurement.

34. The method of claim 31 wherein the options include measurement units.

35. The method of claim 24 further comprising changing display of the data based on user actions.

36. The method of claim 35 wherein the user actions are provided via a set of controls of the handheld computer device.

37. An apparatus comprising:
means for receiving data from an attachable sensor connected to an attachable device, the attachable sensor performing data acquisition when connected to the attachable device, wherein the attachable device is attachable to a handheld computer device, and the attachable sensor is programmable by the handheld computer device, and wherein when the attachable device is attached to the handheld computer, a combination of the attachable device and the handheld computer has a handheld size;
means for processing the data at the attachable device;
means for allowing users of the handheld computer device to interact with the handheld computer device during the data acquisition; and
means for providing results of the processing to the handheld computer device for display.

* * * * *